United States Patent
Vanderberg et al.

(10) Patent No.: US 9,067,614 B2
(45) Date of Patent: Jun. 30, 2015

(54) TRAVEL COOLER WITH TRANSITIONABLE U-SHAPED HANDLE

(71) Applicant: M & C Innovations, LLC, Charlotte, NC (US)

(72) Inventors: Matthew Alexander Vanderberg, Charlotte, NC (US); Daniel Lee Bizzell, Charlotte, NC (US); Ian D. Kovacevich, Carlsbad, CA (US); Chris Hoy, Charlotte, NC (US)

(73) Assignee: M & C INNOVATIONS, LLC, Charlotte, NC (US)

( * ) Notice: Subject to any disclaimer, the term of this patent is extended or adjusted under 35 U.S.C. 154(b) by 65 days.

(21) Appl. No.: 13/831,860

(22) Filed: Mar. 15, 2013

(65) Prior Publication Data

US 2013/0193673 A1 Aug. 1, 2013

Related U.S. Application Data

(63) Continuation-in-part of application No. 13/608,881, filed on Sep. 10, 2012, now Pat. No. 8,424,901, which is a continuation of application No. 12/711,236, filed on Feb. 23, 2010, now abandoned, which is a (Continued)

(51) Int. Cl.
*B62B 1/00* (2006.01)
*B62B 1/12* (2006.01)
(Continued)

(52) U.S. Cl.
CPC ... *B62B 1/12* (2013.01); *B62B 3/16* (2013.01); *B62B 3/10* (2013.01); *B62B 2204/04* (2013.01); *B62B 2204/06* (2013.01); *B62B 2206/02* (2013.01)

(58) Field of Classification Search
CPC .......... B62B 1/00; B62B 1/006; B62B 1/008; B62B 1/04; B62B 1/042; B62B 1/10; B62B 1/12; B62B 1/125; B62B 5/06; B62B 5/061; B62B 5/064; B62B 5/065; B62B 5/067; B62B 2205/30; B62B 2206/06
USPC ............................... 280/47.17, 47.315, 655.1
See application file for complete search history.

(56) References Cited

U.S. PATENT DOCUMENTS 3,842,953 A 10/1974 Royet
3,960,252 A 6/1976 Cassimally
(Continued)

FOREIGN PATENT DOCUMENTS

WO 2007063330 A2 6/2007

*Primary Examiner* — Katy M Ebner
(74) *Attorney, Agent, or Firm* — Tillman Wright, PLLC; Chad D. Tillman; Jeremy C. Doerre

(57) ABSTRACT

A travel cooler, includes a body comprising a base, sidewalls, and a lid connected together to define an interior, insulated containment space for holding cooler items. A lengthwise dimension of the cooler extends between opposite ends of the cooler, and the body defines recessed exterior surface slots extending along a lengthwise extent of the cooler. The cooler further includes a U-shaped handle having two legs connected by a handle portion. The cooler is transitionable between a first configuration, in which the legs of the U-shaped handle extend a substantial length from the body of the cooler, and a second configuration, in which the legs of the U-shaped handle are received within the recessed exterior surface slots extending along a lengthwise extent of the cooler, the handle portion extending in close proximity to an end of the body of the cooler.

17 Claims, 14 Drawing Sheets

Related U.S. Application Data continuation-in-part of application No. 12/236,636, filed on Sep. 24, 2008, now Pat. No. 7,677,581, which is a continuation of application No. 12/127,011, filed on May 27, 2008, now Pat. No. 7,458,590, which is a continuation of application No. 11/380,199, filed on Apr. 25, 2006, now Pat. No. 7,387,305.

(60) Provisional application No. 60/674,622, filed on Apr. 25, 2005.

(51) Int. Cl.
*B62B 3/16* (2006.01)
*B62B 3/10* (2006.01)

(56) References Cited

U.S. PATENT DOCUMENTS

| | | | |
|---|---|---|---|
| D284,620 S | 7/1986 | Calton | |
| 4,645,262 A * | 2/1987 | Furubotten | 297/129 |
| 4,673,117 A | 6/1987 | Calton | |
| 4,988,216 A | 1/1991 | Lyman | |
| 5,115,947 A | 5/1992 | McDonnell et al. | |
| 5,228,706 A * | 7/1993 | Boville | 280/43.22 |
| D340,351 S | 10/1993 | Wrath | |
| 5,313,817 A * | 5/1994 | Meinders | 62/457.1 |
| 5,484,046 A * | 1/1996 | Alper et al. | 190/115 |
| 5,529,220 A | 6/1996 | Credle et al. | |
| D371,942 S | 7/1996 | Lippincott et al. | |
| D375,403 S | 11/1996 | Melk | |
| 5,957,354 A | 9/1999 | Mentken | |
| 5,964,384 A | 10/1999 | Young | |
| 5,967,390 A * | 10/1999 | Goryl | 224/153 |
| 6,015,072 A | 1/2000 | Young | |
| 6,053,382 A | 4/2000 | Wyant | |
| 6,131,917 A * | 10/2000 | Walsh | 280/43.1 |
| 6,336,577 B1 | 1/2002 | Harris et al. | |
| 6,364,329 B1 | 4/2002 | Holub et al. | |
| 6,375,202 B2 * | 4/2002 | Weck et al. | 280/47.35 |
| 6,427,886 B1 | 8/2002 | Essex | |
| 6,536,637 B1 | 3/2003 | McLaughlin | |
| 6,892,915 B2 | 5/2005 | Mares | |
| 7,165,705 B2 | 1/2007 | Haro | |
| 7,290,775 B2 | 11/2007 | Parker et al. | |
| 7,730,739 B2 | 6/2010 | Fuchs | |
| 8,403,162 B2 | 3/2013 | Vanderberg et al. | |
| 8,424,699 B2 | 4/2013 | Vanderberg et al. | |
| 8,424,708 B2 | 4/2013 | Vanderberg et al. | |
| 8,424,901 B2 | 4/2013 | Vanderberg et al. | |
| 8,430,264 B2 | 4/2013 | Jewram et al. | |
| 8,448,813 B2 | 5/2013 | Vanderberg et al. | |
| 8,544,872 B2 | 10/2013 | Vanderberg et al. | |
| 8,695,839 B1 | 4/2014 | Vanderberg | |
| 2002/0095947 A1 | 7/2002 | Treppedi et al. | |
| 2004/0238570 A1 | 12/2004 | Skillern | |
| 2005/0279123 A1 | 12/2005 | Maldonado et al. | |
| 2008/0099476 A1 | 5/2008 | Fung | |
| 2008/0128422 A1 | 6/2008 | Adler et al. | |
| 2008/0149676 A1 | 6/2008 | Bartel | |
| 2009/0184143 A1 | 7/2009 | Witt et al. | |
| 2009/0241584 A1 | 10/2009 | Hayes et al. | |
| 2009/0274398 A1 | 11/2009 | Mentken | |
| 2010/0025934 A1 | 2/2010 | Hassman et al. | |
| 2010/0212351 A1 | 8/2010 | Chapin et al. | |
| 2013/0193657 A1 | 8/2013 | Vanderberg et al. | |
| 2013/0193673 A1 | 8/2013 | Vanderberg et al. | |
| 2013/0200581 A1 | 8/2013 | Vanderberg et al. | |
| 2013/0207359 A1 | 8/2013 | Vanderberg et al. | |
| 2013/0207360 A1 | 8/2013 | Vanderberg et al. | |
| 2013/0214501 A1 | 8/2013 | Vanderberg et al. | |

\* cited by examiner

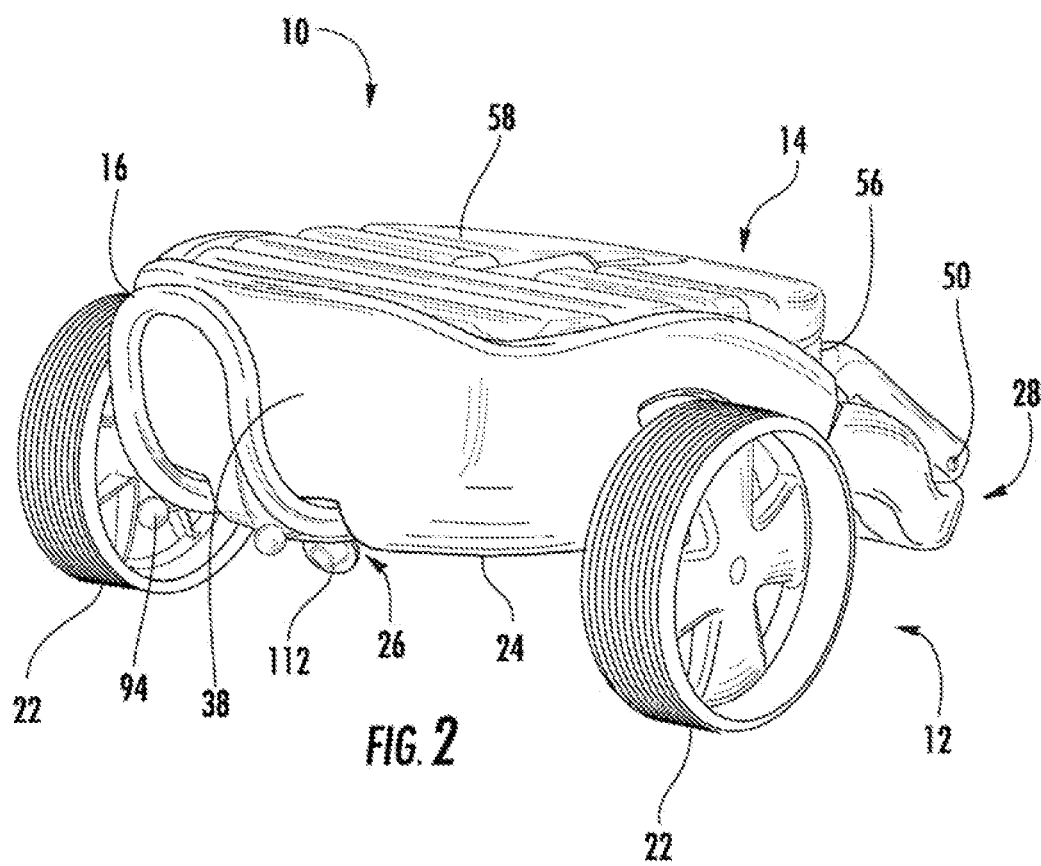

TRAVEL COOLER WITH TRANSITIONABLE U-SHAPED HANDLE

CROSS-REFERENCE TO RELATED APPLICATIONS

The present application is a U.S. continuation-in-part patent application of, and claims priority under 35 U.S.C. §120 to, U.S. nonprovisional patent application Ser. No. 13/608,881, filed Sep. 10, 2012, pending, which nonprovisional patent application published as U.S. patent application publication no. 2013/0001905, which patent application and any patent application publications thereof are incorporated by reference herein, and which '881 application is a U.S. continuation application of, and claims priority under 35 U.S.C. §120 to, U.S. nonprovisional patent application Ser. No. 12/711,236, filed Feb. 23, 2010, abandoned, which '236 application published as U.S. patent application publication no. 2010/0154464, which '236 application and corresponding publication are incorporated by reference herein, and which '236 application is a U.S. continuation-in-part patent application of, and claims priority under §120 to, U.S. nonprovisional patent application Ser. No. 12/236,636, filed Sep. 24, 2008, now issued as U.S. Pat. No. 7,677,581, which '636 application and corresponding patent are incorporated by reference herein, and which '636 application is a U.S. continuation application of, and claims priority under §120 to, U.S. nonprovisional patent application Ser. No. 12/127,011, filed May 27, 2008, now issued as U.S. Pat. No. 7,458,590, which '011 application and corresponding patent are incorporated by reference herein, and which '011 application is a U.S. continuation application of, and claims priority under §120 to, U.S. nonprovisional patent application Ser. No. 11/380,199, filed Apr. 25, 2006, now issued as U.S. Pat. No. 7,387,305, which '199 application and corresponding patent are incorporated by reference herein, and which '199 application is a U.S. nonprovisional application of, and claims priority under §119(e) to, provisional patent application 60/674,622, filed Apr. 25, 2005, the entire disclosure of which provisional application is hereby incorporated herein by reference. The present application further incorporates by reference U.S. patent application publication no. 2011/0197625, which discloses some embodiments of coolers having one or more common aspects and features as those found in embodiments of the present invention, which are disclosed herein.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, or other governmental authority or agency, but otherwise reserves all copyright rights whatsoever.

BACKGROUND OF THE INVENTION

When spending a day at the beach, a family or group generally has many items that they wish to take with them to the beach. Such items may include towels, chairs, umbrellas, games, lotions and sun screen products, food and beverages, and the like.

It is often the situation that transporting the desired items to the beach is inconvenient and cumbersome. Indeed, it often requires many trips back and forth from a car or hotel room to a particular spot on the beach.

Various mobile devices are known that can aid in such transport. However, such known devices generally comprise either a wheeled cart for transporting non-perishable items, such as towels, chairs, etc., or a wheeled cooler for transporting perishable items, such as food and beverages. Such known devices do not generally include a mobile device that is capable of transporting both non-perishable items as well as perishable items, and such known devices generally do not include a sufficient capacity to transport all, or even most, of the items that a family or group will need for a day-long outing at the beach in a single trip. Rather, a person generally still has to make multiple trips from the originating location, e.g., car or hotel room, to the destination location, e.g., spot at the beach.

An additional drawback to known devices is that such devices generally require a large amount of storage space when not used. Such mobile devices are typically stored in a garage, storage shed or closet when not in use because of the bulk of the devices. Further, these mobile devices take up relatively large amounts of space whenever they are transported for use. This is particularly disadvantageous when the mobile devices are packed into the family car when going on the family vacation at the beach. Because they are so large and bulky, they tend to consume a large portion of the available space in the car, thereby limiting the other items that can be taken on the vacation. In addition to being disadvantageous for consumers, such devices also are less desirable to retailers, who have limited shelf space on which to display goods for sale.

One of the known devices is disclosed in U.S. Pat. No. 6,474,097 to Treppedi et al., which is hereby incorporated herein by reference. The mobile carrying device of Treppedi comprises a cooler that includes ski runners and wheels in combination to aid in mobility of the cooler. It also includes an extendable, pivoting handle that may be retracted and stored adjacent the cooler. Cargo nets are attached to the top and side of the cooler for storage of supplies such as towels, plates and cups. The mobile cooler also includes a retainer attached to a side of the cooler for holding an umbrella.

Another known device is disclosed in U.S. Pat. No. 6,176,499 to Conrado, which is hereby incorporated herein by reference. The mobile carrying device of Conrado is a mobile cooler that includes a cooler body with wheels and a pivoted towing handle having two grips for users of varying heights. The underside of the cooler lid has a recess with a cover panel for storing items separately from other items in the cooler. The cooler includes a table assembly operable independently of the cooler lid so that the table may be utilized whether the lid is open or closed. The cooler also includes retractable bungee cords for securing items to the cooler.

The devices of Treppedi and Conrado are exemplary of the shortcomings of the known devices previously discussed herein. Specifically, these devices do not provide sufficient capacity for transporting the number of items to be used for a family or group during a day at the beach. Furthermore, these devices do not have a storage configuration that is smaller in volume than their use configuration.

Collapsible insulated containers also are known which may be utilized for storage of perishable items and that have a storage configuration that is smaller in volume than their use configuration. Such known devices are disclosed, for example, by U.S. Pat. Nos. 3,347,060; 4,085,785; 4,091,852; and 4,612,781, each of which is hereby incorporated herein by reference. However, such known devices do not include design features that aid in mobility of the devices, let alone design features that aid in the transport of non perishable items such as towels, chairs, umbrellas, games, lotions and sun screen products.

Accordingly, a need exists for a mobile device that can be used to transport both non-perishable and perishable items and that has enough capacity to transport a sufficient amount of such items for a day at the beach. Moreover, a need exists for a mobile device that is capable of transporting a relatively large number of both perishable and non-perishable items and that has a storage configuration that is substantially smaller in dimensions than its use configuration.

One or more such needs are met by one or more travel coolers in accordance with embodiments of the present invention.

SUMMARY OF THE INVENTION

The present invention includes many aspects and features.

First Aspect of the Invention

A travel cooler in accordance with a first aspect of the invention includes a wheeled platform and an insulated container configured to be selectively coupled to and uncoupled from the wheeled platform. The wheeled platform comprises a base, a plurality of wheels mounted to the base for rolling movement of the platform and a first coupling component fixedly disposed on the base. The insulated container includes a second coupling component fixedly disposed on the container. The first and second coupling components are disengaged from one another when the insulated container is uncoupled from the wheeled platform. The first and second coupling components are disposed in interlocking engagement when the insulated container is coupled to the wheeled platform, whereby the insulated container is securely coupled to the wheeled platform in fixed disposition relative thereto for safe transportation on the wheeled platform. The base defines a container receiving recess within which a bottom portion of the insulated container is received when the insulated container is coupled to the wheeled platform.

In a feature of this aspect, the base includes a peripheral wall defining the container receiving recess. It is preferred that the peripheral wall define a profile that matches a profile of the outer periphery of the insulated container such that the peripheral wall extends in close proximity to the outer periphery of the insulated container when the insulated container is coupled to the wheeled platform. It is further preferred that the peripheral wall completely encircles the outer periphery of the insulated container when the insulated container is coupled to the wheeled platform.

In another feature of this aspect, the wheeled platform extends below and beyond the insulated container such that no portion of the insulated container extends laterally beyond an edge of the wheeled platform.

In yet another feature of this aspect, the first and second coupling components are configured to snap into interlocking engagement with one another.

In still yet another feature of this aspect, the insulated container further includes a wall, and the second coupling component is fixedly disposed on the wall. With further regard to this feature, the wall comprises a bottom wall of the insulated container. In accordance with this feature, the first coupling component is disposed on a top surface of the base. It is preferred that the insulated container further includes a drain conduit, and the base includes an opening configured to receive the drain conduit therein when the insulated container is coupled to the wheeled platform.

In a feature of this aspect, the insulated container comprises an inflatable wall. It is a further feature of this aspect that the wheels of the base consist of a pair of coaxial wheels. It is yet a further feature that the insulated container comprises inflatable sidewalls and at least one valve for filing the inflatable walls with air.

In a variation of this aspect, the travel cooler comprises a wheeled platform and an insulated container. The wheeled platform includes a base, a plurality of wheels mounted to the base for rolling movement of the platform, and a first plurality of coupling components fixedly disposed on the base. The insulated container is configured to be selectively coupled to, and uncoupled from, the wheeled platform and includes a second plurality of coupling components fixedly disposed on the container. Each of the first plurality of coupling components is disengaged from a respective one of the second plurality of coupling components when the insulated container is uncoupled from the wheeled platform. Each of the first plurality of coupling components is disposed in interlocking engagement with a respective one of the second plurality of coupling components when the insulated container is coupled to the wheeled platform, whereby the insulated container is securely coupled to the wheeled platform in fixed disposition relative thereto for safe transportation on the wheeled platform. The base defines a container receiving recess within which a bottom portion of the insulated container is received when the insulated container is coupled to the wheeled platform.

In a feature of this variation of the aspect, the first plurality of coupling components is configured to snap into interlocking engagement with the second plurality of coupling components. In accordance with this feature, the insulated container further includes a bottom wall and the plurality of second coupling components are fixedly disposed on the bottom wall proximate to a perimeter of the bottom wall. In furtherance of this feature, the first plurality of coupling components is disposed on a top surface of the base with the first plurality of coupling components being disposed in the same arrangement relative to one another as the arrangement of the second plurality of coupling components. It is preferred that the insulated container further includes a drain conduit, that the base includes an opening configured to receive the drain conduit therein when the insulated container is coupled to the wheeled platform, and that the first plurality of coupling components encircle the opening in the base. It is further preferred that the insulated container comprises inflatable sidewalls and at least one valve for filing the inflatable walls with air.

In another variation of this aspect, the travel cooler comprises a wheeled platform, an insulated container, and means for selectively coupling and uncoupling the wheeled platform and the insulated container, whereby the insulated container can be securely coupled to the wheeled platform for safe transportation on the wheeled platform. The wheeled platform includes a base and a plurality of wheels mounted to the base for rolling movement of the platform. The base defines a container receiving recess within which a bottom portion of the insulated container is received when the insulated container is coupled to the wheeled platform.

Second Aspect of the Invention

A travel cooler in accordance with a second aspect of the invention includes a wheeled platform and an insulated container. The wheeled platform includes a base and a plurality of wheels mounted to the base for rolling movement of the platform. The insulated container includes an inflatable wall and a valve for inflating of the wall. The insulated container is disposed on the base in fixed disposition relative to the base for safe transportation of the insulated container on the wheeled platform.

In a variation of this aspect, the travel cooler comprises a wheeled platform and an insulated container. The wheeled platform includes a base, a handle attached to the base, and a plurality of wheels mounted to the base for rolling movement of the platform by the handle. The insulated container includes inflatable sidewalls and at least one valve for inflating of the sidewalls. The insulated container is disposed on the base in fixed disposition relative to the base for safe transportation of the insulated container on the wheeled platform.

In a feature of this variation of the aspect, the insulated container includes a non-inflatable, rigid bottom wall. In a further feature of this variation, the sidewalls include non-pleated, smooth exterior surfaces.

In yet another feature of this variation, the inflatable sidewalls comprise a single, inflatable bladder, and the bladder comprises a substantially air impermeable, flexible material that defines an inner wall and an outer wall with an enclosed space extending there between for receiving air. In accordance with this feature, the bladder is in an inflated condition when the enclosed space has been substantially filled with air, and the bladder is in a collapsed condition when air is substantially absent from the enclosed space. It is preferred that the travel cooler consumes a significantly smaller space for storage when the bladder is in the collapsed condition than when the bladder is in the inflated condition.

In an additional feature of this variation, the plurality of wheels mounted to the base consists of a pair of wheels mounted to the base, and the handle is configured in the attachment to the base to impart to the base, inter alia, pivoting movement about an axis of the pair of wheels.

In another feature of this variation, the plurality of wheels mounted to the base comprises a pair of wheels mounted proximate one end of opposed rear and front ends of the base. In accordance with this feature, the handle is attached to the base between the plurality of wheels and the one end of the base.

In furtherance of this variation, the sidewalls completely encircle an interior, insulated space of the insulated cooler for storing perishable food items.

In yet another feature of this variation, the insulated container is attached to the base by a plurality of fasteners. It is preferred that the plurality of fasteners comprises snap fasteners.

In accordance with this variation, the insulated container further comprises a rigid, non-inflatable rim that is coextensive with a top of the inflatable sidewalls and to which the inflatable sidewalls are attached. It is preferred that the sidewalls are attached to the rim by a first plurality of fasteners whereby the rim is removable from the sidewalls. It is further preferred that the first plurality of fasteners comprises snap fasteners. In accordance with this feature, the insulated container is attached to the base by a second plurality of fasteners whereby the insulated container is removable from the base. It is further preferred that the second plurality of fasteners comprises snap fasteners.

In a feature of this variation, the travel cooler further comprises a hand pump for inflating of the inflatable sidewalls.

In a further feature of this variation, the insulated container further comprises a hand pump removably mounted to an exterior surface of the insulated container, the hand pump being configured for mating engagement with the at least one valve for inflating of the inflatable sidewalls. It is preferred that the insulated container further comprises a lid and that the hand pump is removably mounted to the exterior surface of the top of the lid.

Third Aspect of the Invention

In another aspect of this invention, the travel cooler comprises a base, a plurality of wheels mounted to the base for rolling movement of the base, and an insulated container having sidewalls supported by the base and defining an interior, insulated space for receiving and preserving perishable food items. The base includes a portion that extends beyond at least one of the sidewalls to define a cargo receiving area for receiving items for transport.

In a feature of this aspect, the base includes a length between front and rear ends of the base, and the portion of the base extends between about one-half and about one-quarter of the length of the base. In a further feature, the portion of the base further extends at an elevation proximate a bottom of the insulated container. In yet another feature, the portion of the base is inclined and extends to an elevation below a bottom of the insulated container. In still yet another feature, the portion of the base comprises a surface upon which additional items may be supported for transport.

In accordance with this aspect, the portion of the base includes a distal end, and the cargo receiving area extends between the distal end and the insulated container. In furtherance of this aspect, the portion of the base includes a distal end, and the distal end of the portion of the base further comprises a handle for lifting of a rear end of the travel cooler.

In another feature of this aspect, the portion of the base includes a distal end and further comprises a retaining member that generally extends upwardly proximate the distal end of the portion of the base. The retaining member may further generally extend outwardly away from the insulated container. In accordance with this feature, the cargo receiving area is defined between the insulated container and the upwardly extending retaining member. In furtherance of this feature, the upwardly extending retaining member comprises a handle for lifting of a rear end of the travel cooler, and the distal end of the portion of the base further comprises a handle for lifting of the rear end of the travel cooler. Also in accordance with this feature, the upwardly extending retaining member is connected in pivotable disposition relative to the portion of the base. It is preferred that the upwardly extending retaining member is connected to the portion of the base by a hinge. It is also preferred that the upwardly extending retaining member is configured to move between a protracted position, wherein the retaining member generally extends upwardly, and a retracted position, wherein the retaining member generally extends adjacent to the portion of the base.

In a variation of this aspect, the travel cooler comprises a base, a plurality of wheels mounted to the base for rolling movement of the base, an insulated container supported by the base and defining an interior, insulated space for receiving and preserving perishable food items, and a retaining member mounted to the base and configured to move between a protracted position relative to the insulated container, wherein the retaining member and the insulated container define a cargo receiving area there between for receiving items for transport, and a retracted position relative to the insulated container, wherein the retaining member is disposed proximate the insulated container such that the cargo receiving area is substantially eliminated.

In a feature of this variation, the retaining member is connected to the base for pivoting movement relative thereto. In a further feature of this variation, the retaining member is connected to the base for linear, sliding movement relative thereto. In yet another feature of this variation, the travel cooler further comprises opposed panels connected to the retaining member, whereby the retaining member and the side panels define a basket for receiving items for transport when the retaining member is in the protracted position.

In another variation of this aspect, the travel cooler comprises a base, a plurality of wheels mounted to the base for rolling movement of the base, an insulated container supported by the base and defining an interior, insulated space for receiving and preserving perishable food items, and a bracket removably mounted to the insulated container with the bracket defining a cargo receiving area for receiving items for transport exterior to the insulated container.

Fourth Aspect of the Invention

In another aspect of this invention, the travel cooler comprises a base, a handle attached to the base at a first location and generally extending upwardly from the base when attached to the base at the first location, a plurality of wheels mounted to the base for rolling movement of the base by the handle, and an insulated container having sidewalls supported by the base and defining an interior, insulated space for receiving and preserving perishable food items. The handle is removably attached to the base such that the handle is detachable and removable from the base. The base is configured to receive and retain the handle at a second location when the handle is detached from the base at the first location, with the handle generally extending horizontally relative to the base when attached at the second location. The handle itself preferably is rigid.

In a feature of this aspect of the invention, the second location is located underneath the base for storage of the handle when the travel cooler is not in use. In another feature, an underneath of the base defines one or more channels or slots for receiving lengths of the handle therein. In yet another feature, the handle is U-shaped and includes two legs connected by a handle portion, wherein the base defines two parallel, elongate cavities that extend generally horizontally therethrough. Preferably, the legs of the handle are received within the cavities when the handle is attached to the base at the second location, and the handle portion extends adjacent a side of the base.

In another feature of this aspect, the handle further includes a spring-biased catch, and the handle is disposed by the catch in locked disposition relative to the base when the handle is attached to the base at the second location. It is preferred that the handle further is disposed by the catch in locked disposition relative to the base when the handle is attached to the base at the first location.

In another feature of this aspect, the base includes a first coupling component fixedly disposed on the base, wherein the insulated container includes a second coupling component fixedly disposed on the container; the first and second coupling components are disengaged from one another when the insulated container is uncoupled from the base; and the first and second coupling components are disposed in interlocking engagement when the insulated container is coupled to the base, whereby the insulated container is securely coupled to the base in fixed disposition relative thereto for safe transportation on the base. It is preferred that the base defines a container receiving recess within which a bottom portion of the insulated container is received when the insulated container is coupled to the base.

In yet another feature, the sidewalls of the container are inflatable, and the insulated container further includes a valve for inflating of the sidewalls. It is preferred that the travel cooler further comprises a hand pump removably mounted to an exterior surface thereof with the hand pump being configured for mating engagement with the valve for inflating of the inflatable sidewalls. It is also preferred that the inflatable sidewalls comprise a single, inflatable bladder, and that the bladder comprises a substantially air impermeable, flexible material that defines an inner wall and an outer wall with an enclosed space extending there between for receiving air. It is further preferred that the bladder is in an inflated condition when the enclosed space has been substantially filled with air, and the bladder is in a collapsed condition when air is substantially absent from the enclosed space, with the travel cooler consuming a significantly smaller space for storage when the bladder is in the collapsed condition and the handle is attached to the base at the second location than when the bladder is in the inflated condition and the handle is attached to the base at the first location.

In still yet another feature, the base includes a portion that extends beyond at least one of the sidewalls to define a cargo receiving area for receiving items for transport. In accordance with this feature, the portion of the base includes a distal end, and the distal end of the portion of the base further comprises a handle for lifting of a rear end of the travel cooler. In furtherance of this feature, the portion of the base includes a distal end, and the travel cooler further comprises a retaining member that generally extends upwardly proximate the distal end of the portion of the base. It is preferred that the upwardly extending retaining member comprises a handle for lifting of a rear end of the travel cooler and that the distal end of the portion of the base further comprises a handle for lifting of the rear end of the travel cooler. In accordance with this feature, the upwardly extending retaining member is connected in pivotable disposition relative to the portion of the base. It is preferred that the upwardly extending retaining member is connected to the portion of the base by a hinge. It is also preferred that the upwardly extending retaining member is configured to move between a protracted position, wherein the retaining member generally extends upwardly, and a retracted position, wherein the retaining member generally extends adjacent to the portion of the base.

Fifth Aspect of the Invention

In another aspect of the invention, the travel cooler comprises a base, an insulated container having an interior, insulated space for receiving and preserving perishable food items, and a pneumatic hand pump. An exterior of the travel cooler defines a pneumatic hand pump receiving area for receiving and retaining the pneumatic hand pump.

In a feature of this aspect, an exterior of the insulated container comprises the exterior of the travel cooler defining the receiving area for receiving and retaining the pneumatic hand pump. In another feature of this aspect, the receiving area comprises a recessed area having a profile generally commensurate in shape with the pneumatic hand pump. In yet another feature of this aspect, the sidewalls of the container are inflatable, and the insulated container further includes a valve for inflating of the sidewalls, with the pneumatic hand pump being configured for mating engagement with the valve for inflating of the inflatable sidewalls. It is preferred that the insulated container comprises a lid, and the pneumatic hand pump is removably mounted to the lid. It is further preferred that the inflatable sidewalls comprise a single, inflatable bladder, and the bladder comprises a substantially air impermeable, flexible material that defines an inner wall and an outer wall with an enclosed space extending there between for receiving air. The bladder is in an inflated condition when the enclosed space has been substantially filled with air, and the bladder is in a collapsed condition when air is substantially absent from the enclosed space, with the travel cooler consuming a significantly smaller space for storage when the bladder is in the collapsed condition than when the bladder is in the inflated condition In another feature of this aspect, a plurality of wheels is mounted to the base for rolling movement of the base. It is preferred that a handle also is attached to the base for rolling movement of the base by the handle.

In yet another feature of this aspect, the base includes a first coupling component fixedly disposed on the base; and the insulated container includes a second coupling component fixedly disposed on the container. The first and second coupling components are disengaged from one another when the insulated container is uncoupled from the base, and the first and second coupling components are disposed in interlocking engagement when the insulated container is coupled to the base, whereby the insulated container is securely coupled to the base in fixed disposition relative thereto for safe transportation on the base. In accordance with this feature, the base defines a container receiving recess within which a bottom portion of the insulated container is received when the insulated container is coupled to the base.

In another feature, the base includes a portion that extends beyond the insulated container to define a cargo receiving area for receiving items for transport. In furtherance of this feature, the portion of the base includes a distal end, and the distal end of the portion of the base further comprises a handle for lifting of a rear end of the travel cooler. It is preferred that the portion of the base includes a distal end, and that the cooler further comprises a retaining member that generally extends upwardly proximate the distal end of the portion of the base. It is further preferred that the upwardly extending retaining member comprises a handle for lifting of a rear end of the travel cooler and that the distal end of the portion of the base comprises a handle for lifting of the rear end of the travel cooler. In accordance with this feature, the upwardly extending retaining member is connected in pivotable disposition relative to the portion of the base. In further accordance with this feature, the upwardly extending retaining member is connected to the portion of the base by a hinge. It is preferred that the upwardly extending retaining member is configured to move between a protracted position, wherein the retaining member generally extends upwardly, and a retracted position, wherein the retaining member generally extends adjacent to the portion of the base.

In a variation of this aspect, the travel cooler comprises an insulated container having an interior, insulated space for receiving and preserving perishable food items, an insulated lid for covering the interior, insulated space of the insulated container, and a pneumatic hand pump. The lid includes a pneumatic hand pump receiving area in which the pneumatic hand pump is removably received and retained.

In a feature of this variation, the insulated container comprises an inflatable wall and a valve for inflating of the wall, and the pneumatic hand pump is configured for mating engagement with the valve for inflating of the inflatable wall.

Sixth Aspect of the Invention

In another aspect of the invention, a stacked arrangement of travel coolers comprises a plurality of travel coolers arranged in a series of stacking pairs, wherein each travel cooler includes a base that includes a bottom surface; a pair of wheels mounted to the base for rolling movement of the base with each wheel of the pair being disposed on a respective lateral side of the base; an insulated container having an interior, insulated space for receiving and preserving perishable food items; a front end of the base; and a rear end of the base, with the pair of wheels being mounted closer to the front end of the base than the rear end of the base.

Each stacking pair includes an upper travel cooler disposed on top of a lower travel cooler with the bottom surface of the base of the upper travel cooler resting upon the bottom surface of the base of the lower travel cooler, and with the lower travel cooler having been turned upside down. The front end of the upper travel cooler is disposed over and generally aligned with the rear end of the lower travel cooler.

In a feature of this aspect, each of the bottom surfaces of the travel coolers is disposed at an incline such that the base of the upper travel cooler is disposed to slide, in response to gravity, toward the front end of the lower travel cooler whereby the pair of wheels of the upper travel cooler are disposed in abutting engagement with the pair of wheels of the lower travel cooler.

In another feature, the insulated container of each travel cooler comprises an inflatable wall, and each inflatable wall of each the travel cooler is deflated.

In yet another feature, each travel cooler further includes a lid mounted to the insulating container for covering the interior, insulated space, and adjacent stacking pairs include a lower travel cooler of an upper pair disposed on top of an upper travel cooler of a lower pair, with a surface of the lid of the lower travel cooler of the upper pair resting upon a surface of the lid of the upper travel cooler of the lower pair, and with the lower travel cooler of the upper pair having been turned upside down, and the front end of the lower travel cooler of the upper pair being disposed over and generally aligned with the rear end of the upper travel cooler of the lower pair. In accordance with this feature, each lid of each travel cooler comprises a hand pump receiving area disposed in an exterior surface thereof for storage of a pneumatic hand pump, and each travel cooler further comprises a pneumatic hand pump releasably received and retained in the hand pump receiving area.

In a variation of this aspect, a stacked arrangement of travel coolers comprises a plurality of travel coolers arranged in a series of stacking pairs. Each travel cooler includes a base; a pair of wheels mounted to the base for rolling movement of the base with each wheel of the pair being disposed on a respective lateral side of the base; an insulated container having an interior, insulated space for receiving and preserving perishable food items; a lid mounted to the container for covering the interior, insulated space; a front end of the base; and a rear end of the base with the pair of wheels being mounted closer to the front end of the base than the rear end of the base. Each stacking pair includes an upper travel cooler disposed on top of a lower travel cooler, with a surface of the lid of the upper travel cooler resting upon a surface of the lid of the lower travel cooler, and with the upper travel cooler having been turned upside down. The front end of the upper travel cooler is disposed over and generally aligned with the rear end of the lower travel cooler.

In a feature of this variation, each surface of the lids of the pair of stacking travel coolers is contoured whereby the stacking pair of travel coolers are inhibited from sliding on top of each another.

In another feature of this variation, the surface of a lid of the pair of stacking travel coolers is contoured for mating engagement with the surface of the other lid of the pair of stacking travel coolers, whereby the travel coolers interlock and are inhibited from sliding when disposed on top of each another.

In yet another feature, each insulated container of each travel cooler comprises an inflatable wall, and each inflatable wall of each travel cooler is deflated.

In still yet another feature, each lid of each travel cooler comprises a hand pump receiving area disposed in an exterior surface thereof for storage of a pneumatic hand pump, and each travel cooler further comprises a pneumatic hand pump releasably received and retained in the hand pump receiving area. It is preferred that each insulated container of each travel cooler comprises an inflatable wall and that each the inflatable wall of each the travel cooler is deflated.

In another variation of this aspect relates to a method of stacking travel coolers. Each travel cooler includes a base including a bottom surface; a pair of wheels mounted to the base for rolling movement of the base, with each wheel of the pair being disposed on a respective lateral side of the base; an insulated container having an interior, insulated space for receiving and preserving perishable food items; a lid mounted to the container for covering the interior, insulated space; a front end of the base; and a rear end of the base, with the pair of wheels being mounted closer to the front end of the base than the rear end of the base. The method comprises the steps of: disposing a first travel cooler on top of a second travel cooler such that the bottom surface of the base of the first travel cooler rests upon the bottom surface of the base of the second travel cooler, with the second travel cooler having been turned upside down, and such that the front end of the first travel cooler is over and generally aligned with the rear end of the second travel cooler; and, disposing a third travel cooler on top of the second travel cooler such that a surface of the lid of the third travel cooler rests upon a surface of the lid of the first travel cooler, with the third travel cooler having been turned upside down, and such that the front end of the third travel cooler is over and generally aligned with the rear end of the first travel cooler.

In a feature of this variation, the bottom surface of the first travel coolers is disposed at an incline such that the base of the first travel cooler is disposed to slide, in response to gravity, toward the front end of the second travel cooler whereby the pair of wheels of the first travel cooler are disposed in abutting engagement with the pair of wheels of the second travel cooler.

In another feature of this variation, the surface of the lid of the first travel cooler is contoured to engage a contour of the surface of the lid of the third travel cooler, whereby the third travel cooler is inhibited from sliding on top of the first travel cooler.

In yet another feature, the second travel cooler is disposed on top of another travel cooler. In a variation thereof, the second travel cooler instead is the lowermost travel cooler in the stack.

In accordance with this variation, each insulated container of the first, second, and third travel coolers comprises an inflatable wall, and each inflatable wall is deflated. In furtherance of this variation, each lid of the first, second and third travel coolers comprises a hand pump receiving area disposed in an exterior surface thereof for storage of a pneumatic hand pump, and each of the first, second, and third travel coolers further comprises a pneumatic hand pump releasably received and retained in the hand pump receiving area thereof.

In a further variation of this aspect, a stacked arrangement of travel coolers is formed by the method described hereinabove.

Other aspects and features are set forth in the '225 application, which aspects and features are incorporated by reference herein.

In addition to the aforementioned aspects and features of the present invention, the present invention further includes the various possible combinations and permutations of such aspects and features.

BRIEF DESCRIPTION OF THE DRAWINGS

Further aspects, features, embodiments, and advantages of the present invention will become apparent from the following detailed description with reference to the drawings, wherein:

FIG. 2 is a perspective view of the travel cooler of FIG. 1A in a storage configuration;

DETAILED DESCRIPTION OF THE INVENTION

Figure 1A:
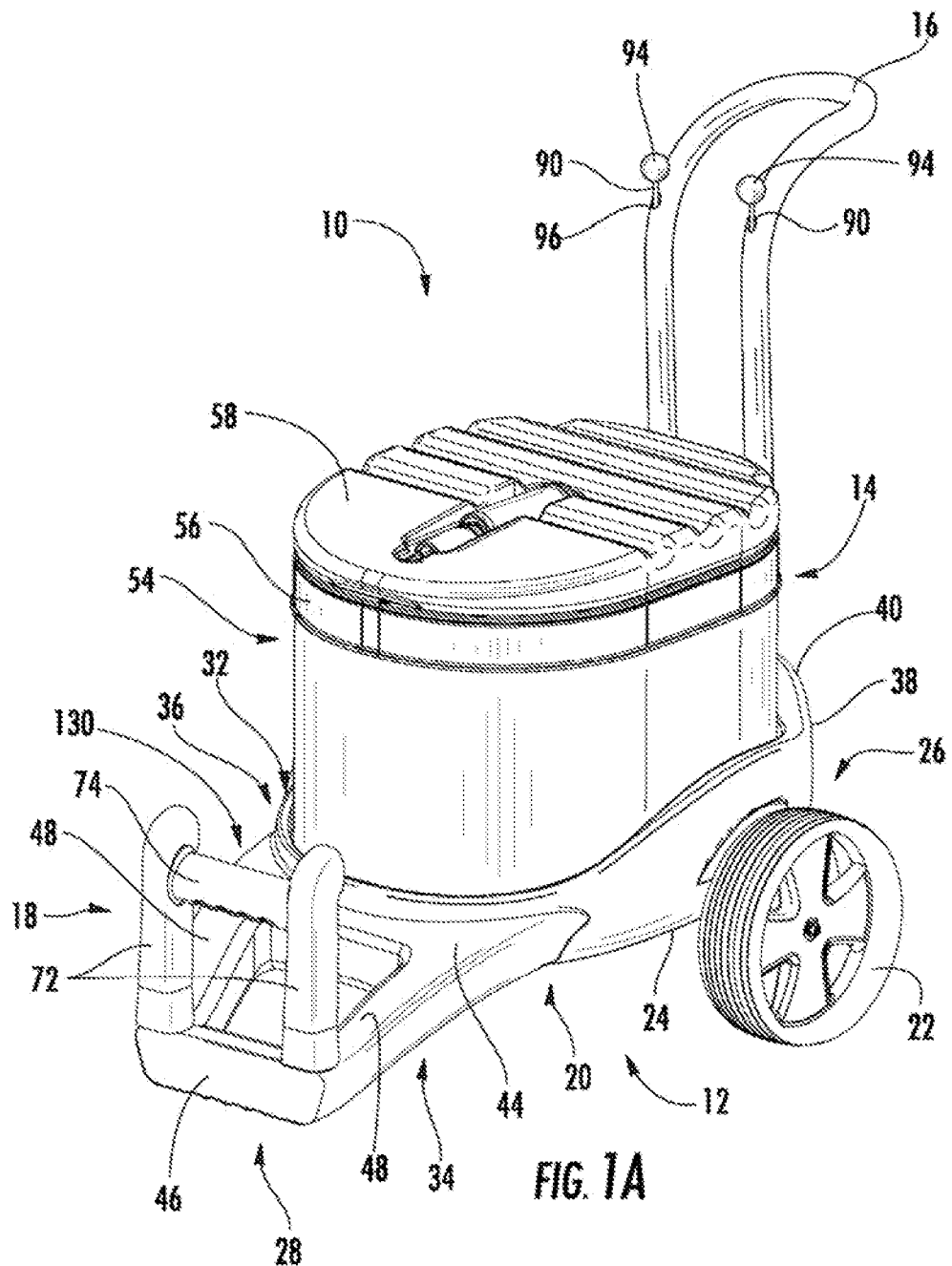
FIG. 1A is a perspective view of a travel cooler in accordance with the preferred embodiments of the present invention in a transport configuration.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention and may or may not be a preferred embodiment. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, preferred embodiments of the present invention are next described. The following description of preferred embodiment(s) is merely exemplary in nature and is in no way intended to limit the invention, its application, or uses.

Figure 1B:
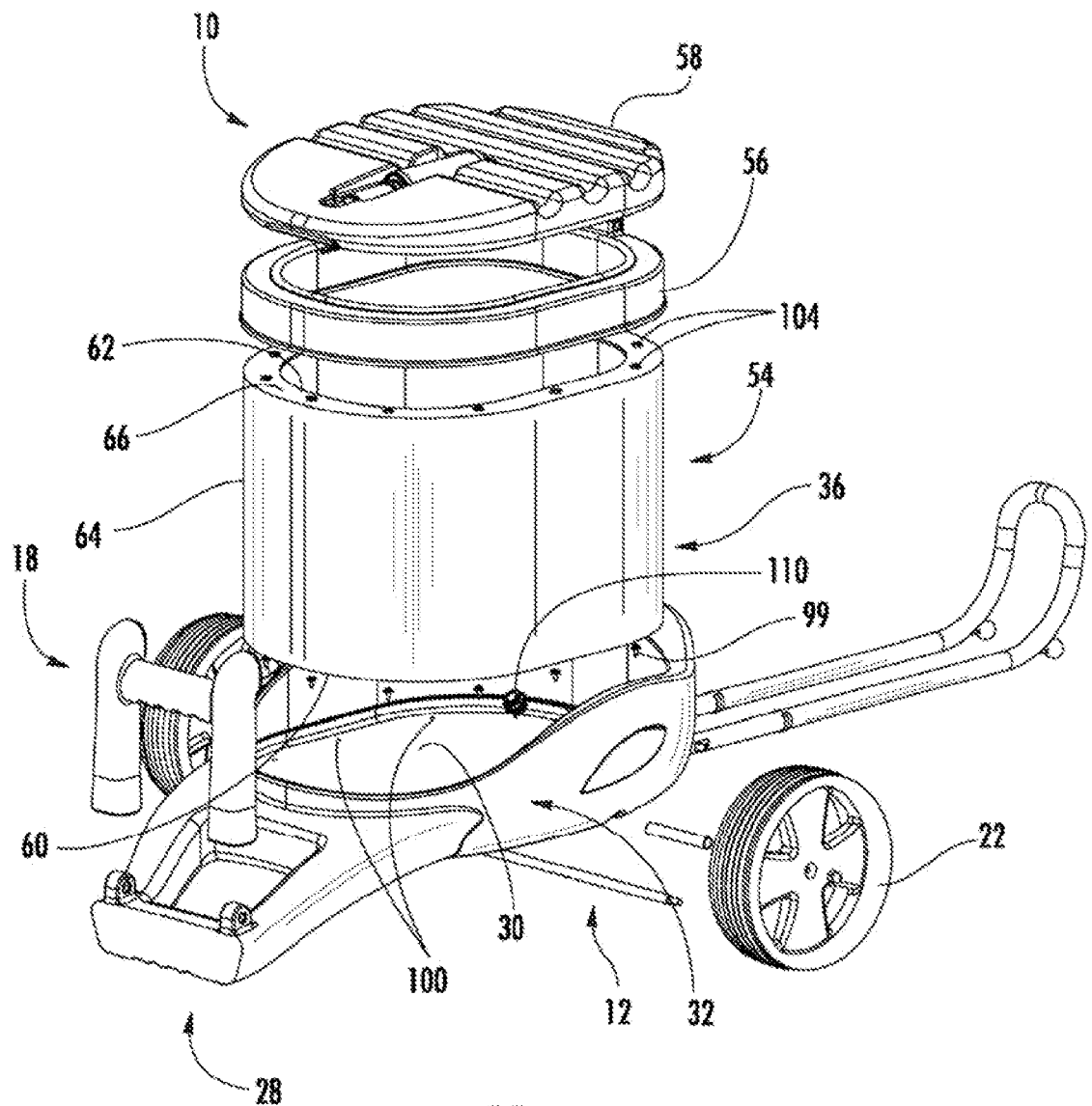
FIG. 1B is an exploded perspective view of the travel cooler of FIG. 1A.

FIG. 1A is a perspective view of a travel cooler 10 in a transport configuration in accordance with the preferred embodiments of the present invention. FIG. 1B is an exploded perspective view of the travel cooler of FIG. 1A. The travel cooler 10 comprises a wheeled platform 12, an insulated container 14, a handle 16 and a retaining member 18. The wheeled platform 12 comprises a base 20 and a pair of coaxial wheels 22.

Figure 4:
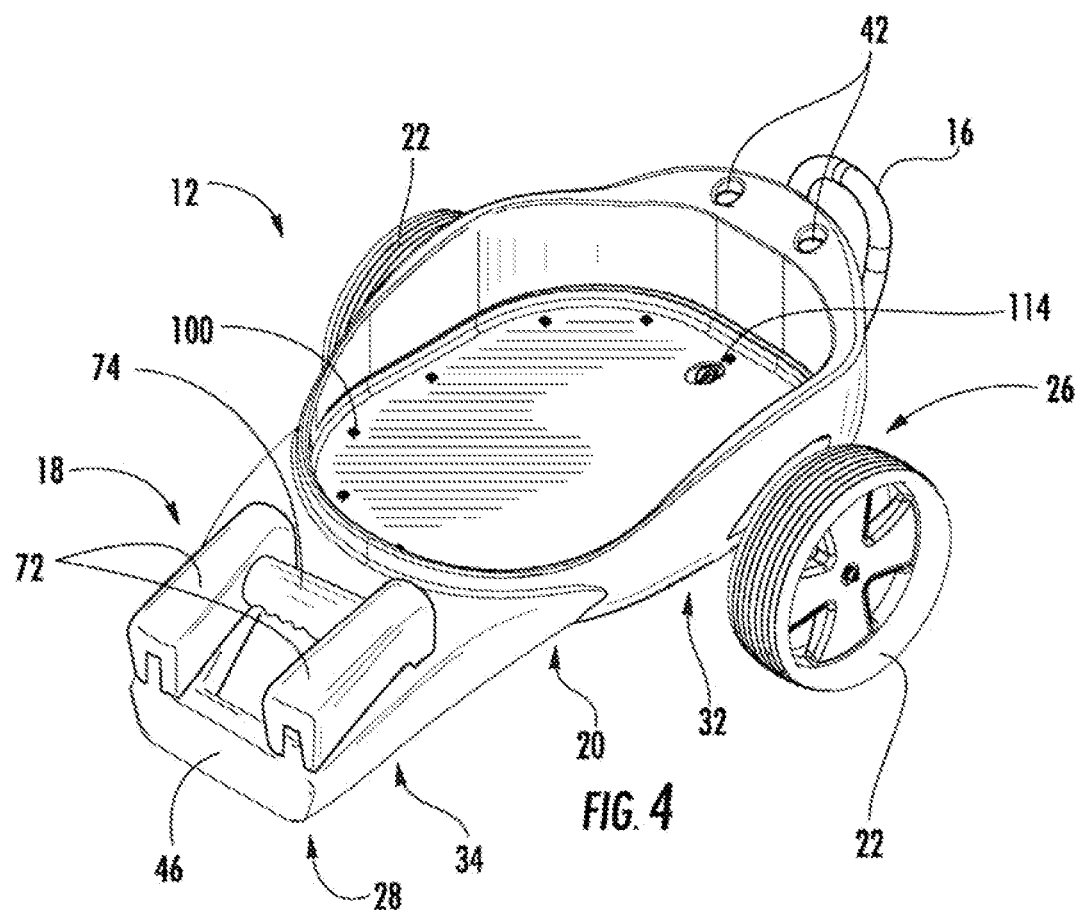
FIG. 4 is a perspective view of the wheeled platform of the travel cooler of FIG. 1A without the insulated container disposed thereon.

The base 20 includes a bottom 24, a first end 26, a second end 28, and a top surface 30. The base 20 includes a length defined by the distance between the first end 26 and the second end 28. The base 20 further includes a container receiving recess 32 and an extension portion 34. FIG. 4 is a perspective view of the wheeled platform 12 without the insulated container 14 disposed thereon. As illustrated therein, the container receiving recess 32 is disposed near the first end 26 of the base 20 and is configured to receive a bottom portion 36 of the insulated container 14. The container receiving recess 32 includes a peripheral wall 38 that defines a profile that matches a profile of the outer periphery of the insulated container 14 such that the peripheral wall 38 extends in close proximity to and/or in abutment with the outer periphery of the insulated container 14 for support thereof when the insulated container 14 is coupled to the wheeled platform 12. The peripheral wall 38 completely encircles the outer periphery of the insulated container 14 when the insulated container 14 is coupled to the wheeled platform 12, and no portion of the insulated container 14 extends laterally beyond an edge of the wheeled platform 12.

The peripheral wall 38 has a front end 40, which is disposed at the first end 26 of the base 20. The front end 40 of the peripheral wall 38 defines a handle recess 42 for receiving and retaining the handle 16 at a first location. In the illustrated embodiment, the handle recess 42 is a pair of vertically-oriented tubular recesses that extend downward into the top of the front end 40 of the peripheral wall 38. The extension portion 34 of the wheeled platform base 20 extends below and beyond the insulated container 14 toward the second end 28 of the base 20 from the container receiving recess 32. The extension portion 34 extends between one-half and one-quarter of the length of the base 20. In the illustrated embodiment, the extension portion 34 is fixedly mounted to the container receiving recess 32. However, the Ordinary Artisan will understand that, alternatively, the extension portion 34 may be mounted for movement relative to the container receiving recess 32, including pivotable movement and/or linear sliding movement. Furthermore, the Ordinary Artisan will understand that the base 20 may not include the extension portion 34. In such embodiment, the second end 28 of the base 20 is disposed adjacent the container receiving recess 32. Additionally, in such embodiment, the cooler 10 does not include the retaining member 18.

The extension portion 34 extends from the container receiving recess 32 at an elevation proximate a bottom 60 of the insulated container 14. The extension portion 34 also extends downwardly at an incline to an elevation below the bottom 60 of the insulated container 14, which generally corresponds to a surface on which the cooler 10 rests when stationary. The extension portion 34 includes a surface upon which additional items may be supported for transport.

The extension portion 34 may be trapezoidal in form with a first side 44 in abutting arrangement with the container receiving recess 32 and a second side 46 disposed a fixed distance from and substantially parallel to the first side 44. Two additional sides 48 extend between the first side 44 and the second side 46 to form the trapezoidal shape of the extension portion 34. The second side 46 of the extension portion 34 has indentations formed therein defining a handgrip for receipt of the fingers of a user.

The retaining member 18 comprises two leg members 72 arranged in parallel relation to one another, each having a first end and a second end. The leg members 72 are connected to one another at their first ends by a cross-beam 74 that extends orthogonally between the two members 72. The cross-beam 74 includes indentations in the surface thereof defining a handgrip for receipt of the fingers of a user. In the upright, protracted position shown in FIG. 1A, the retaining member 18 is disposed substantially orthogonally to a surface on which the travel cooler 10 is placed, usually the ground. Although the retaining member 18 is disposed in an upright position in the present embodiment, the Ordinary Artisan will understand that the retaining member 18 may further extend outwardly from the insulated container 14. The second ends of the leg members 72 are pivotally connected to the second end 28 of the base 20 with one or more pivoting connection members 50. In the illustrated embodiment, the pivoting connection member 50 is a hinge. However, the Ordinary Artisan will understand that any connection mechanism that provides a pivoting connection may be used to connect the retaining member 18 to the base 20.

Figure 7:
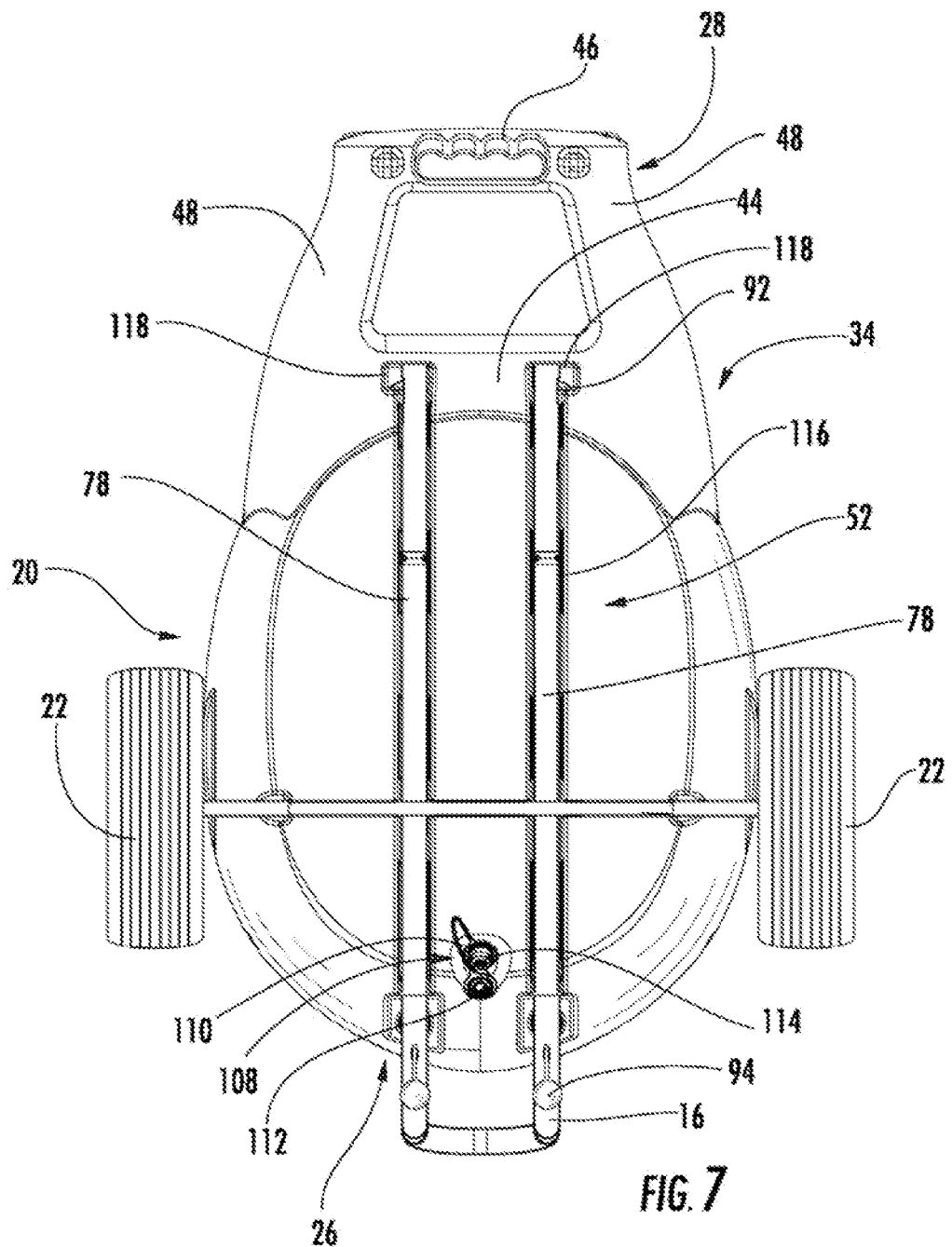
FIG. 7 is a bottom view of the travel cooler of FIG. 1A showing the handle disposed at a second location on the base in a handle receiving area.

As best seen in FIG. 7, the bottom 24 of the base 20 defines a handle receiving area 52 for receipt of the handle 16 therein at a second location. A pair of wheels 22 are coaxial with one another and are connected to the base 20 with a conventional wheel axle. The wheels 22 facilitate rolling motion of the travel cooler 10 from one location to another and are preferably constructed of a material capable of supporting the weight of the items stored in and on the cooler 10. It is preferred that the wheels 22 be able to support at least about ninety pounds. It is more preferred that the wheels 22 be able to support at least about one hundred ten pounds. Additionally, the wheels 22 are preferably large enough to easily roll across terrain such as sand on a beach or grass in a park. The dimensions of the wheels 22 preferably are about ten inches in diameter and about three inches in tread width.

Figure 3:
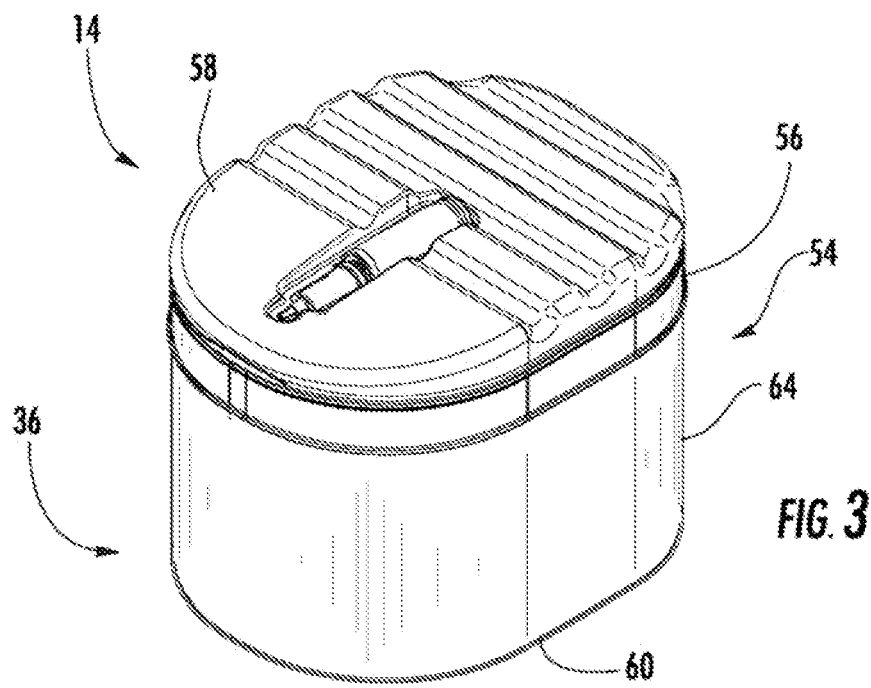
FIG. 3 is a perspective view of the insulated container of the travel cooler of FIG. 1A.

The insulated container 14 may be used as a cooler when uncoupled from the wheeled platform 12 as shown in FIG. 3. The insulated container 14 itself comprises a bladder 54, a rim 56 and a lid 58. The bladder 54 includes a bottom wall 60, inflatable sidewalls, including an inner wall 62 and an outer wall 64, and an upper edge wall 66. Such walls are perhaps best seen in FIG. 1B. The bottom wall 60 extends across and encloses the bottom portion 36 of the container 14. The bottom wall 60 of the insulated container 14 is non-inflatable and may be rigid, semirigid, or flexible. When the bladder 54 is deflated, the inner wall 62 and outer wall 64 extend in an orthogonal direction away from the bottom wall 60 and define an enclosed space there between for receipt of air. The inner wall 62 and outer wall 64 are comprised of a substantially air-impermeable, flexible material. The inner wall 62 and outer wall 64 are connected by the bottom wall 60 and the upper edge wall 66. The inner wall 62 and outer wall 64 include non-pleated, smooth exterior surfaces, and the outer wall 64 defines the outer periphery of the container 14.

In the transport configuration, the bladder 54 is in an inflated condition, wherein the enclosed space is substantially filled with air. Air is received into the enclosed space through a valve 70 disposed in the outer wall 64 of the bladder 54. In the illustrated embodiment, the valve 70 is disposed near the first end 26 of the base 20. As such, the valve 70 is near the handle 16 when the travel cooler 10 is in the transport configuration. When the enclosed space is filled with air, the air creates enough rigidity that the walls of the bladder 62, 64 are generally upstanding. Such air also serves to insulate the interior space of the container 14, thereby facilitating the container's use as a cooler. In the inflated condition, the insulated container 14 preferably sized to have a capacity to hold sixty-two quarts in the insulated, interior space of the container 14.

The rim 56 is disposed on the upper edge wall 66 of the bladder 54 and connected thereto as further described hereinbelow. The rim 56 may be generally oval shaped with an opening in the center allowing items to be placed inside the container 14, while the lid 58 is similarly shaped to correspond with the rim 56. The lid 58 is connected by hinge to the rim 56 such that the lid 58 may be opened and closed without fully detaching the lid 58 from the container 14. The rim 56 and lid 58 are comprised of a rigid, non-inflatable material and therefore do not collapse when air is evacuated from the enclosed space of the bladder 54. The lid 58, the rim 56 and the retaining member 18, which is described hereinabove, are preferably durable and rigid and are formed in one or more molding processes. The molding processes may include injection molding, rotational molding, and/or blow molding. Furthermore, the lid 58, rim 56 and retaining member 18 may be integrally formed or separately formed and thereafter connected together.

Figure 8:
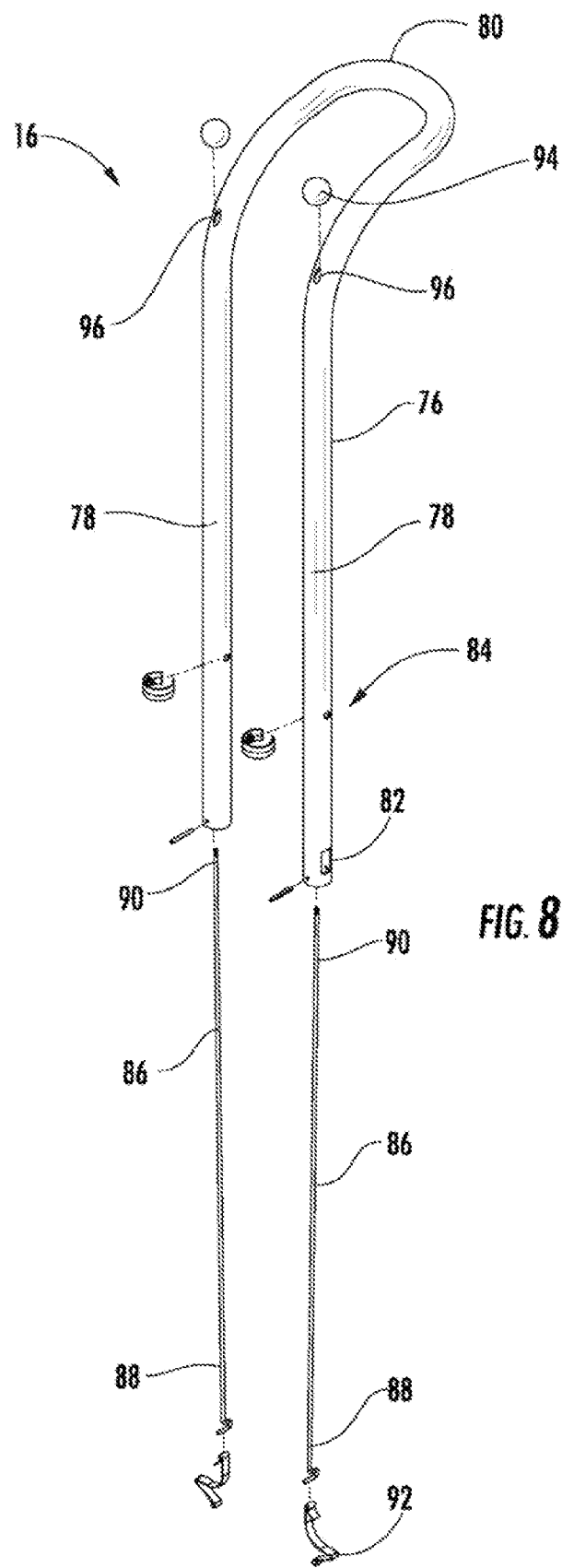
FIG. 8 is an exploded view of the detachable handle of the travel cooler of FIG. 1A.

FIG. 8 is an exploded perspective view of the handle 16 of the travel cooler 10 of FIG. 1A. The handle 16 comprises an elongate rigid tube 76 bent back on itself to create a "U"-shaped bend in the middle. The handle 16 includes two matching legs or extension portions 78 disposed in parallel relation to one another and spaced a fixed distance from one another and a "U"-shaped bent handle portion 80 disposed at proximal ends of the extension portions 78. Further, the extension portions 78 each have a first opening 82 disposed therein at the distal ends of the extension portions 78. In addition to the bent portion 80 being bent into a "U"-shape, it also bends generally orthogonally away from the extension portions 78 so as to be easily grasped by a user. In the present embodiment, the handle 16 is constructed of aluminum. However, the Ordinary Artisan will understand that the handle may be constructed of any material that is durable, malleable and relatively light.

The handle 16 further comprises a pair of catch assemblies 84, one disposed within each of the extension portions of the handle 78. The catch assemblies 84 are identical in design and operation, and thus only one will be described herein. A catch assembly 84 comprises a rod 86, having a first end 88 and a second end 90, a catch 92 disposed at the first end 88 of the rod 86 and a ball 94 disposed at the second end 90 of the rod 86. The rod 86 is substantially enclosed within the extension portion of the handle 78. A portion of the catch 92 is disposed within the extension portion 78, and another portion of the catch 92 extends through the first opening 82. The second end 90 of the rod 86 extends through a second opening 96 disposed at the proximal end of the extension portion 78 and is connected to the ball 94, which is disposed outside the extension portion 78. When the ball 94 is pulled by a user, the rod 90 actuates the catch 92, thereby moving the catch 92 such that the portion of the catch 92 that extends through the first opening 82 is pulled inwardly into the extension portion 78. When the ball 94 is released, a portion of the catch 92 returns to being extended through the first opening 82. The catch 92 is spring-biased.

FIG. 2 is a perspective view of the travel cooler 10 of FIG. 1A in a storage configuration. When in its storage configuration, the travel cooler 10 is significantly smaller in dimension than when the travel cooler 10 is in its transport configuration. In fact, when the travel cooler 10 is in its storage configuration, the total height of the cooler 10 as a whole is substantially the same as the height of the base 20. Thus, the travel cooler 10 is compact and easily storable in its storage configuration.

Specifically, when the travel cooler 10 is in its storage configuration, the insulated container 14 is collapsed, rather than inflated as it is in its transport configuration. More particularly, the bladder 54 of the insulated container 14 is collapsed. The enclosed space between the inner wall 62 and outer wall 64 is substantially evacuated of air, and thus the flexible walls 62, 64 of the insulated container 14 have no supporting force to hold them upright. When the bladder 54 is collapsed, the lid 58 and the rim 56 are received into the container receiving recess 32. The depth of the container receiving recess 32 is such that the lid 58 and rim 56 fit substantially within the recess 32.

Further, the retaining member 18 is folded inwardly toward the insulated container 14 in a retracted position such that it fits substantially adjacent the extension portion 34 of the base 20 with no portion thereof protracting from the base 20. When the retaining member 18 is in the retracted position, a user may extend his hand or fingers through the trapezoidal opening formed in the extension portion 34 and utilize the second side 46 as a handle for lifting or otherwise manipulating of the travel cooler 10, which feature may be particularly useful when the cooler 10 is not used and in its storage configuration.

In addition, in the storage configuration, the handle 16, which is completely detachable and removable from the base 20, is removed from the handle recess 42 and is placed in the handle receiving area 52 of the base 20. As perhaps best shown in FIG. 2, the bent portion 80 of the handle 16 extends slightly from the wheeled platform 12 when the handle 16 is in this stored position. As such, the handle 16 also may be utilized in the stored position for manipulation of the travel cooler 10.

Returning to FIG. 4, an advantage of the present invention is that the insulated container 14 may be selectively coupled and uncoupled from the wheeled platform 12, more particularly the base 20, and used separately there from. The wheeled platform 12 is preferably durable and rigid and is formed in one or more molding processes. The molding processes may include injection molding, rotational molding, and/or blow molding. Furthermore, the wheeled platform 12 may be integrally formed or separately formed and thereafter connected together.

The insulated container 14 is coupled to the base 20 by coupling components. When the insulated container 14 is coupled to the base 20, the coupling components are disposed in interlocking engagement with one another; thus, the insulated container 14 is securely coupled to the wheeled platform 12 for safe transportation on the wheeled platform 12, i.e., the insulated container 14 is protected from falling off of the base 20.

In the illustrated embodiment, the coupling components are snaps. More particularly, snap buttons 99 are disposed on the bottom wall 60 of the insulated container 14, that are received into corresponding snap sockets 100 in the base 20 to connect the insulated container 14 to the base 20. Such snap sockets 100 are disposed in the top surface 30 of the base 20. The snap buttons 99 may be evenly spaced from one another proximate a perimeter of the bottom wall 60 of the container 14.

In use, when the bottom portion 36 of the container 14 is placed in the container receiving recess 32 of the wheeled platform 12, the snap buttons 99 are received into the mating snap sockets 100 thereby coupling the container 14 and the base 20. If it is desired to uncouple and remove the container 14 from the base 20, a user may pull the container 14 upwardly thereby forcibly disengaging the snap buttons 99 from the snap sockets 100.

The upper edge wall 66 of the bladder 54 is also connected to the rim 56 with coupling components. In the illustrated embodiment, the coupling components are snaps. More particularly, snap sockets 104 are evenly spaced around the upper edge wall 66 of the bladder 54 and mating snap buttons are evenly spaced in corresponding arrangement around the underside of the rim 56 such that the snap sockets 104 and snap buttons mate to connect the rim 56 to the bladder 54. The ability to easily uncouple the bladder 54 from the rim 56 and the wheeled platform 12 is an advantage of the present invention. Such detachability makes it possible to separately replace the bladder 54, the rim 56 and the wheeled platform 12 in the event that one of these components is damaged, as well as to permit the various components to be washed more easily. While not illustrated herein, the Ordinary Artisan will understand that a handle or strap further may be provided on the insulated container 14 for transport of the container 14 when it is uncoupled from the wheeled platform 12.

The bottom wall 60 of the bladder 54 has a drain conduit 108 disposed therein for removal of water or other liquids from the insulated interior space of the insulated container 14. Such liquids may be drained from the insulated container 14 both when the insulated container 14 is coupled to the wheeled platform 12 and when the insulated container 14 is uncoupled from the wheeled platform 14.

The drain conduit 108 includes an interior portion 110 and an exterior portion 112. The interior portion 110 extends through the bottom wall 60 of the insulated container 14 and provides a passageway to drain liquid from the insulated container 14. The exterior portion 112 includes a plug to block the flow of liquid through the interior portion 110. The drain conduit 108 is disposed in the bottom wall 60 of the container 14 and thus remains attached to the container 14 when the container 14 is uncoupled from the wheeled platform 12.

A corresponding drain conduit opening 114 is formed in the container receiving recess 32 for receipt of the exterior portion 112 of the drain conduit 108 therein for removal of liquids from the container 14 when the container 14 is coupled to the wheeled platform 12. When the insulated container 14 is coupled to the wheeled platform 12, the exterior portion 112 of the drain conduit 108 extends through the wheeled platform base 20 via the drain conduit opening 114 for easy access by a user.

In order to remove liquids from the insulated interior of the insulated container 14, a user simply pulls the exterior portion 112 of the drain conduit 108, which opens the drain conduit 108 and allows liquids to flow there through. A user may close the drain conduit 108 when the desired amount of liquid has been drained from the insulated container 14.

As described previously, in order to inflate the bladder 54 of the insulated container 14, air is received into the bladder enclosed space. A hand pump 120 may be utilized to introduce such air into the enclosed space. The hand pump 120 is a conventional dual action hand pump with two mating cylinders 122 and a nozzle 124 disposed at one end. The nozzle 124 is sized to be coupled with the valve 70 such that air may be introduced into the bladder 54 utilizing the hand pump 120. Because the hand pump 120 is a dual action hand pump, air is introduced into the bladder 54 when the hand pump is both pulled and pushed. Accordingly, the bladder 54 can be inflated relatively quickly by hand.

Figure 5:
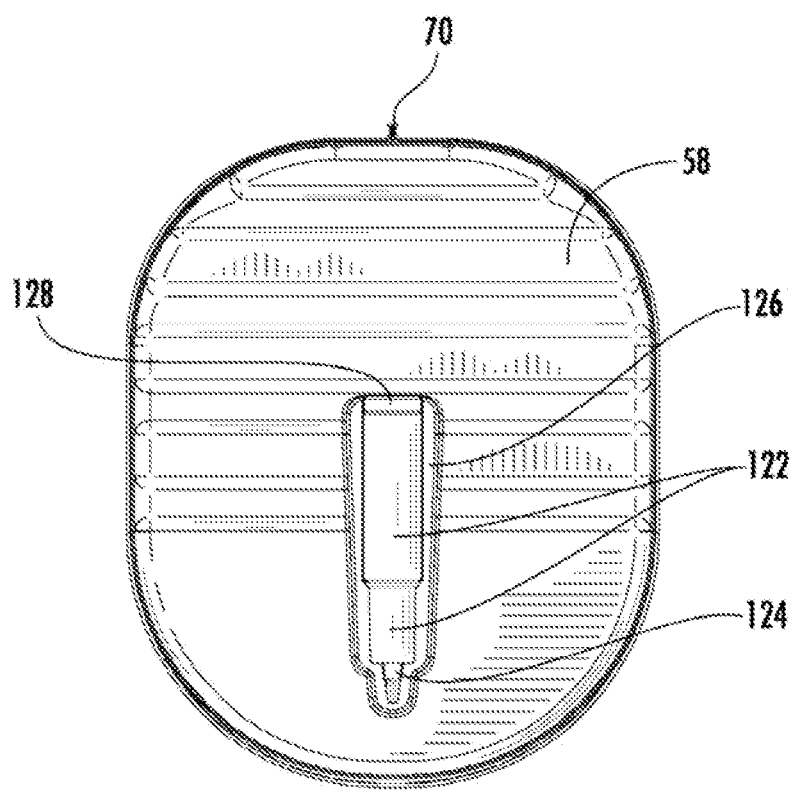
FIG. 5 is a top view of the insulated container with a hand pump retained in a pump receiving recess.
Figure 6:
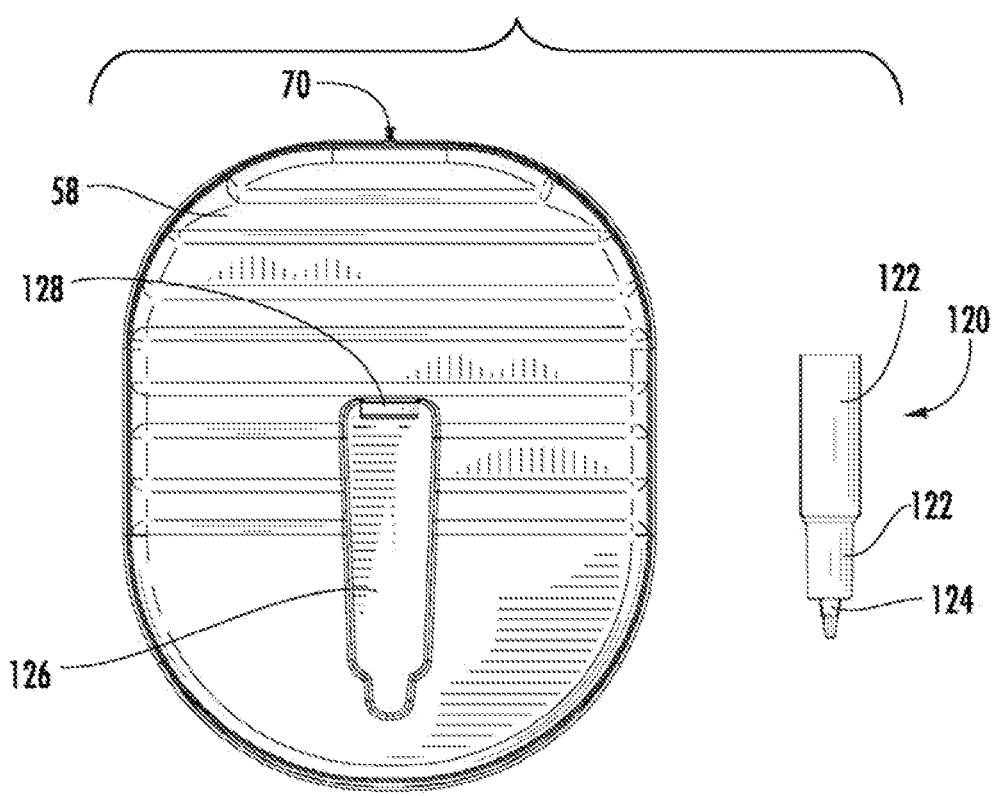
FIG. 6 is a perspective view of the hand pump and a top view of the insulated container with the hand pump removed from the pump receiving recess.

The travel cooler lid 58 defines a pump receiving recess 126 in the exterior thereof for retention of the hand pump 120 when it is not in use. FIG. 5 is a top view of the insulated container 14 with the hand pump 120 retained in such a pump receiving recess 126, and FIG. 6 is a perspective view of the hand pump 120 and a top view of the insulated container 14 with the hand pump 120 removed from the pump receiving recess 126. The shape of the pump receiving recess 126 is commensurate with that of the hand pump 120 so that the hand pump 120 fits snugly within the recess 126 via a pressure fit. In addition, a foam disk 128 fits within the pump receiving recess 126 to aid in retaining the hand pump 120 within the recess 126. The foam disk 128 is configured to couple with the end of the hand pump 120 opposite the end with the nozzle 124. The foam disk 128 of the illustrated embodiment comprises closed cell, cross linked polyethylene. However, any foam material that provides similar functionality may be utilized.

Together, the shape of the pump receiving recess 126 and the foam disk 128 secure the hand pump 120 in the lid 58 when the hand pump 120 is not in use. A user simply pulls the nozzle end of the hand pump 120 to remove the hand pump 120 from the pump receiving recess 126. To return the hand pump 120 to the recess 126, a user couples the mating end of the hand pump 120 with the foam disk 128 and then snaps the hand pump 120 into place in the recess 126. In the present embodiment, the hand pump 120 is retained in the lid 58; however, the Ordinary Artisan will understand that the hand pump 120 may be received and retained anywhere on the travel cooler 10 where sufficient space is available.

FIG. 7 is a bottom view of the travel cooler 10 of FIG. 1A showing the handle 16 disposed in the handle receiving area 52 in the stored position. In the stored position, the handle 16 is securely retained in the handle receiving area 52 in a space-saving configuration. The handle receiving area 52 includes two elongate recesses 116 in matching configuration with the extension portions of the handle 78. The elongate recesses 116 begin at the first end 26 of the base 20 and extend partially into the extension portion 34 of the base 20. Each of the elongate recesses 116 terminates with a further indentation 118 for receipt of the handle catches 92. In addition to having the function described previously, the catches 92 aid in securing the handle 16 in the handle receiving area 52. The handle 16 is further secured in the handle receiving area 52 by the wheel axle, which crosses underneath or behind the handle 16 when the handle 16 is in the stored position. To minimize the space required to store the travel cooler 10, the handle 16 is oriented such that the bent portion 80 is substantially adjacent the peripheral wall 38 of the container receiving recess 32 when the handle 16 is in the handle receiving area 52. In this position, the balls 94 of the catch assemblies 84 are easily accessible to a user for release of the spring-biased catches 92 when the handle 16 is to be detached from the base 20.

The spring-biased catches 92 secure the handle 16 in both the stored position and the upright position; therefore, in order to move the handle 16 from the stored position to the upright position, the catch assemblies 84 are actuated. To actuate such assemblies 84, a user pulls the balls 94 of the catch assemblies 84 thereby moving the catches 92 inwardly into the extension portions of the handle 78. When the catches 92 are disposed within the extension portions 78, the handle 16 may be removed from the handle receiving area 52 by sliding it out of the handle receiving area 52.

To place the handle 16 in the upright position, the user arranges the handle 16 such that the bent portion 80 is oriented toward the user. In this arrangement, the balls 94 of the catch assemblies 84 are easily accessed by the user. The user pulls the balls 94, which allows the extension portions 78 to be slid into the handle recess 42. Once the distal ends of the extension portions 78 have been inserted into the handle recess 42, the user may release the balls 94 and continue sliding the extension portions 78 through the handle recess 42. When the first openings 82 of the extension portions 78 have passed through the handle recess 42, a portion of the catches 92 extend outwardly through the first openings 82 thereby securing the handle 16 from sliding out of the handle recess 42. The handle 16 is secured in the upright position until a user actuates the catch assemblies 84 by pulling on the balls 94 of the catch assemblies 84 and removes the handle 16 from the handle recess 42. In the upright position, the handle 16 may be used to easily pivot and roll the travel cooler 10 from one location to another in similar fashion to how a hand truck may be pivoted and rolled.

Figure 9:
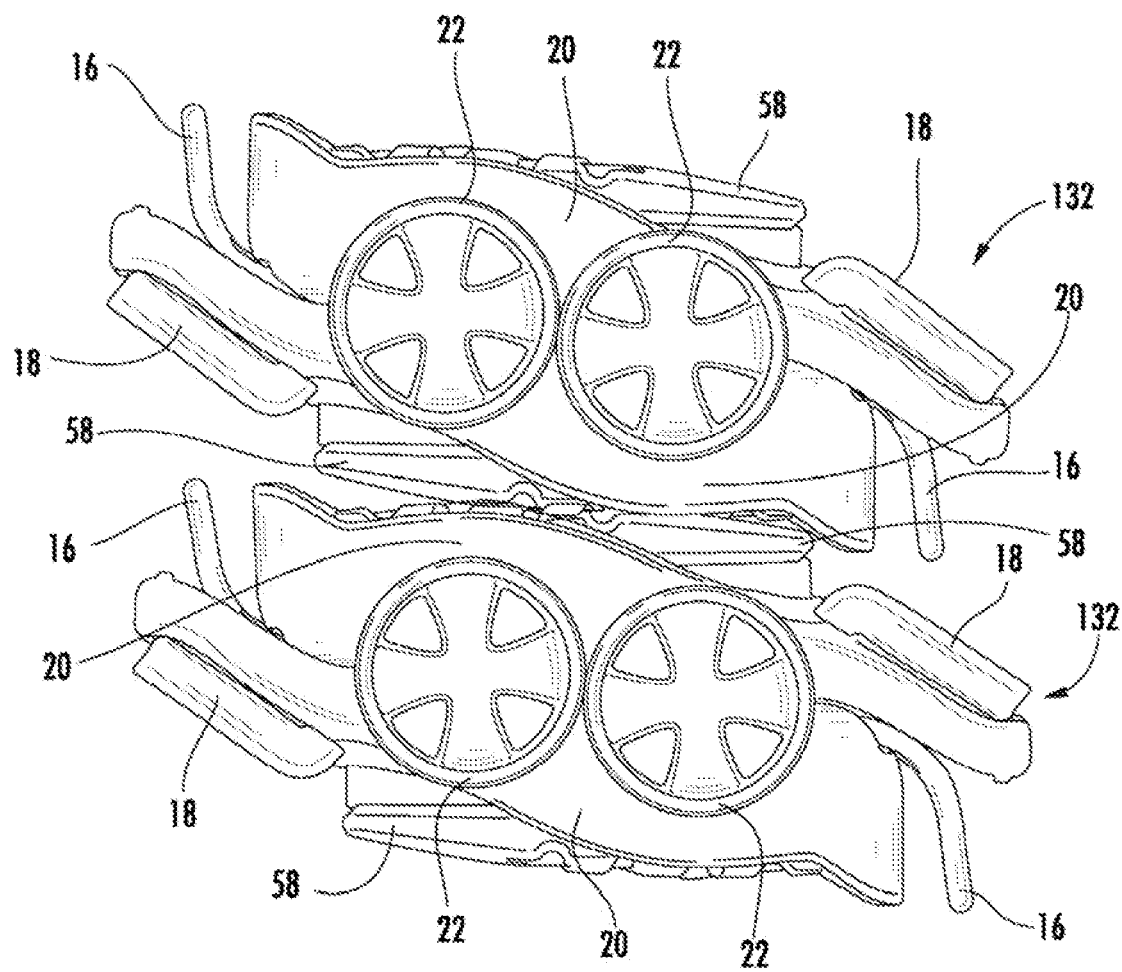
FIG. 9 is a perspective view of four travel coolers in a preferred stacking arrangement.

FIG. 9 is a perspective view of a plurality of travel coolers 10 of the present invention in a preferred stacking arrangement. An advantage of the travel cooler 10 of the present invention is that it may be stacked for storage or for display in a retail setting. As is illustrated by FIG. 9, travel coolers 10 of the present invention may be stacked in a unique, space-saving arrangement.

As discussed previously herein, the bladder 54 collapses into the container receiving recess 32 when air is evacuated from the bladder enclosed space. Further, the rim 56 and lid 58 fit substantially within the container receiving recess 32 such that the height of the cooler 10 in the storage configuration is essentially the same as that of the peripheral wall 38 of the container receiving recess 32. As such, the cooler 10 occupies minimal space when it is in the storage configuration and thus lends itself to being stacked for storage or display.

Referring to the stacking configuration of FIG. 9, a plurality of coolers 10 may be stacked in a series of stacking pairs 132, each having an upper travel cooler 10 disposed on top of a lower travel cooler 10, with the bottoms 24 of the bases 20, more particularly the bottom surfaces of the bases 20, of the two coolers 10 being mated to form a stacking pair 132. In this arrangement, the bottom surface of the base 20 of the upper travel cooler 10 rests upon the bottom surface of the base 20 of the lower travel cooler 10 with the lower travel cooler having been turned upside down. Each of the bottom surfaces of the travel coolers 10 is disposed at an incline such that the base 20 of the upper travel cooler 10 is disposed to slide, in response to gravity, toward the first end 26 of the lower travel cooler 10 whereby the wheels 22 of the upper travel cooler 10 are disposed and maintained in abutting engagement with the wheels 22 of the lower travel cooler 10. In addition, the coolers 10 of each stacking pair 132 are in an alternating arrangement such that the first end 26 of the base 20 of one of the coolers 10 is generally aligned with the second end 28 of the base 20 of the other cooler 10 in the stacking pair 132.

The stacking pairs 132 are further arranged one on top of the other, with the lid 58 of the top cooler 10 in the bottom stacking pair 132 being in adjacent contact with the lid 58 of the bottom cooler 10 in the top stacking pair 132. The stacking pairs 132 are also arranged in an alternating arrangement, with all of the bottom coolers 10 of the stacking pairs 132 being disposed in one direction and all of the top coolers 10 in the stacking pairs 132 being disposed in the opposite direction.

Alternatively, a stacking pair 132 may comprise a bottom cooler 10 and a top cooler 10 arranged such that the lid 58 of the bottom cooler 10 is in abutting engagement with the lid 58 of the top cooler 10. In this alternative stacking pair arrangement, the top cooler 10 has been turned up side down.

In operation, the travel cooler 10 of the present invention may be utilized to transport items from one location to another. When the travel cooler 10 is in the transport configuration, it is ideal for carrying such items. Perishable items may be placed in the insulated container 14 when the container 14 is in the inflated condition. In order to inflate the insulated container 14, air is hand pumped into the bladder enclosed space. Specifically, a user removes the hand pump 120 from the pump receiving recess 126 and couples the hand pump nozzle 124 to the valve 70. The user then operates the dual action hand pump 120 by moving the cylinders 122 in and out in conventional hand pumping action. Once the insulated container 14 has been inflated, the hand pump 120 is removed from the valve 70 and the valve 70 is closed to insure that no air escapes from the space. The hand pump 120 may then be replaced in the pump receiving recess 126.

Non-perishable items, e.g., folded beach chairs, towels, and the like, may be placed in a cargo receiving area 130 bounded by the retaining member 18, the extension portion 34, and the insulated container 14. In addition, because the lid 58 is substantially planar, items may also be placed on top of the lid 58 for transport. Bungee cords may strapped to the cooler 10 and utilized to stabilize such items for transport.

A loaded travel cooler 10 may be easily moved from one location to the next. A user simply grasps the handle 16, tilts the cooler 10 back toward the user using the wheels 22 as pivot members, and begins either pushing or pulling the cooler 10 to the desired location. The extension portion of the cooler 34 is lifted off the ground in a tilted position such that the extension portion 34 does not hinder movement of the cooler 10. During transport, items contained within the cargo receiving area 130 are securely maintained therein by the cooler configuration. When a user arrives at his destination, he simply tilts the cooler 10 back to rest stably on the ground.

Once a user has arrived at the desired location and removed items from the cargo receiving area 130, the retaining member 18 may be folded down or the handle 16 may be placed in the stored position. In addition, the insulated container 14 may be removed from the wheeled platform 12 if so desired.

When a user desires to store the travel cooler 10, liquid may be removed from the container 14 by opening the drain conduit 108 and air may be removed from the bladder space by utilizing the valve 70. More particularly, a user squeezes the valve 70 to open the valve and evacuate air from the enclosed space within the bladder 54. The walls of the container 62, 64 collapse when air has been evacuated from the enclosed space there between. Once the bladder 54 is collapsed, the container lid 58 and rim 56 fit within the container receiving recess 32. The retaining member 18 may be folded to the stored position and the handle 16 moved to the stored position. In this storage configuration, the travel cooler 10 may be easily stored or may be stacked for retail display.

The travel cooler 10 of the present invention is advantageous over known wheeled coolers because the present invention provides a travel cooler 10 that may easily transport both perishable and non-perishable items from one location to another and may be easily stored because the dimensions of the travel cooler 10 may be significantly reduced for storage thereof. A further advantage of the travel cooler 10 is that the insulated container 14 may be uncoupled from the wheeled platform 12 thereof for separate use or for replacement in the event of damage. It is a further advantage of the travel cooler 10 that the cooler 10 is designed to have a minimum amount of failure points. For example, the handle 16 is not connected to the wheeled platform 12 with a hinge that could fail but rather is removably attached to the wheeled platform 12 to provide a more sturdy, reliable attachment point. For components that may be more susceptible to damage, such as the bladder 54, the design makes it possible to replace such components, if damaged. In addition, the length and positioning of the handle 16 provide an advantage for a user when the cooler 10 is being transported by allowing the user to comfortably roll the cooler 10 on its wheeled platform 12 without having to bend over to grab and pull the handle 16 while transporting the cooler 10.

Additional Embodiments of Travel Coolers

Figure 10A:
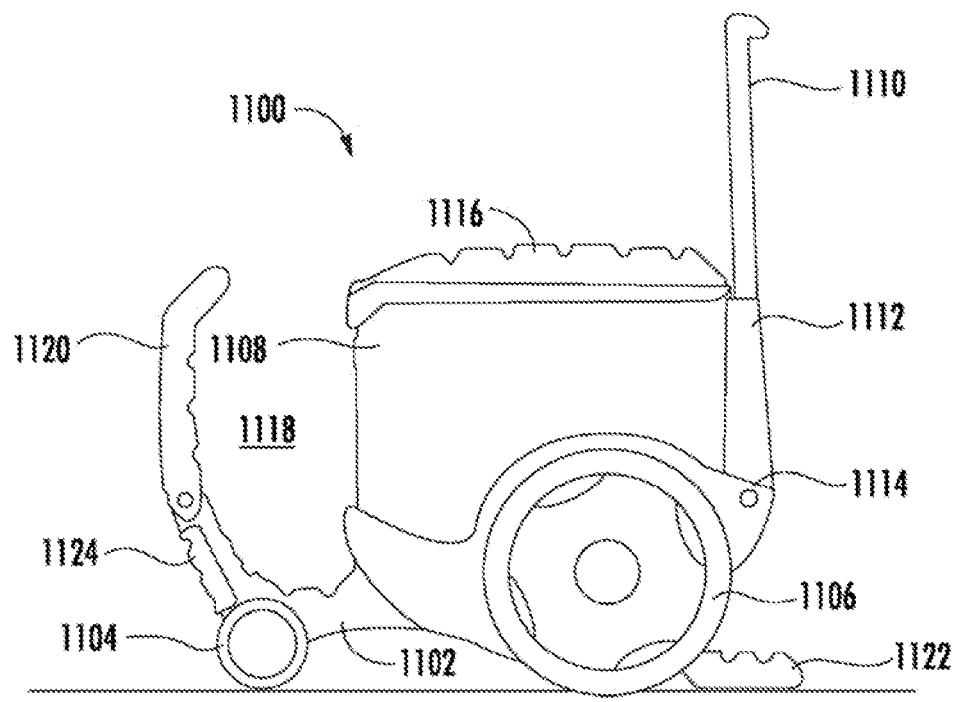
FIG. 10A is a side view of a second embodiment of a travel cooler in an expanded configuration according to the present invention.
Figure 10B:
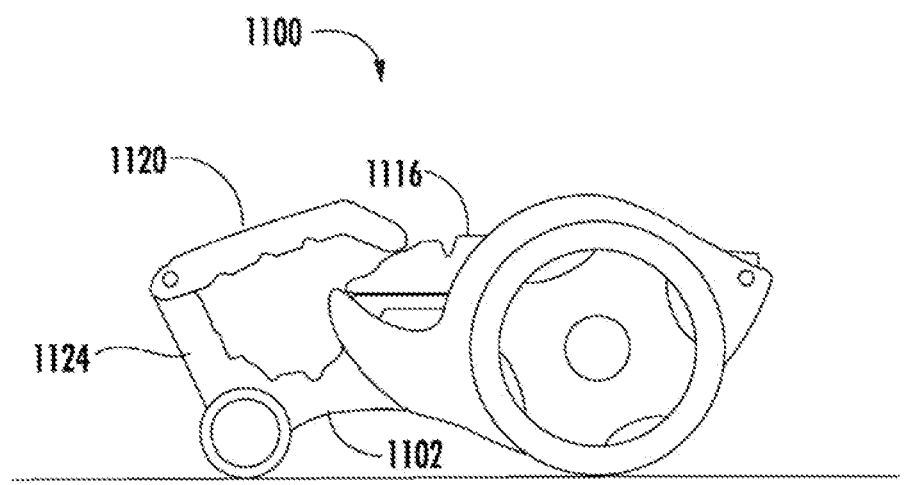
FIG. 10B is a side view of the travel cooler of FIG. 10A in a collapsed configuration.

A second embodiment of the present invention is shown in FIGS. 10A-10B. In this embodiment, the travel cooler 1100 is configurable into a transport configuration as shown in FIG. 10A, and a storage configuration as shown in FIG. 10B. The cooler 1100 includes a platform 1102 having forward wheels 1104 and rearward wheels 1106. The insulated container 1108 also is inflatable in this embodiment. The container 1108 is shown as fully inflated in FIG. 10A, wherein the transport configuration of the cooler 1100 is obtained. In FIG. 10A, an insulated interior space is defined within the container 1108 for receiving, for example, food supplies, beverages, and ice. The container preferably includes at least a double-wall construction with an enclosed space defined between substantially air-impermeable walls for receiving air in inflating the container. Air trapped within the double-wall construction provides thermal insulation to help maintain a low temperature within the compartment of the container despite a warm sunny environment about the cooler. The container is shown as deflated in FIG. 10B, wherein the storage configuration of the cooler 1100 is obtained for convenient portage and storage of the cooler, for example in the rear trunk of an automobile. Moreover, in this regard, certain preferred collapsible coolers of the present invention include configurations that accommodate secure nesting of the coolers on top of each other in vertical stacks.

A telescoping handle of the cooler 1100 has a piston portion 1110 and a cylinder portion 1112 that together are utilized in inflating the container 1108. The telescoping handle pivots about a hinge point 1114 toward the rigid lid 1116 of the container 1108 for minimizing the overall outer dimensions of the cooler 1100 when the storage configuration is obtained (FIG. 10B). The telescoping handle also serves as both a guide handle in directing, pushing and pulling the cooler about in its travels, and as a hand pump for inflating the container 1108 in obtaining the transport configuration of the cooler (FIG. 10A). A stabilizing foot plate 1122 pivots from the platform 1102 to abut the ground below the telescoping handle for stabilizing the cooler as the piston portion 1110 is manually forced into and from the cylinder portion 1112 in hand pumping the telescoping handle to inflate the container 1108.

A cargo receiving area 1118 is defined between the container 1108, the platform 1102, and a retaining member 1120. The cargo receiving area 1118 is useful for receiving an item for ease in transport such as, for example, a folding chair, a shade umbrella, a beach blanket and towels, fishing equipment, and/or other gear. This is especially convenient for transporting items from a car to a sunny spot on the beach. The retaining member 1120 pivots toward the lid 1116 for minimizing the overall outer dimensions of the cooler 1100 when the storage configuration is obtained (FIG. 10B). A rigid carry-handle portion 1124 of the platform 1102 is useful for carrying the cooler when the storage configuration is obtained.

Figure 11A:
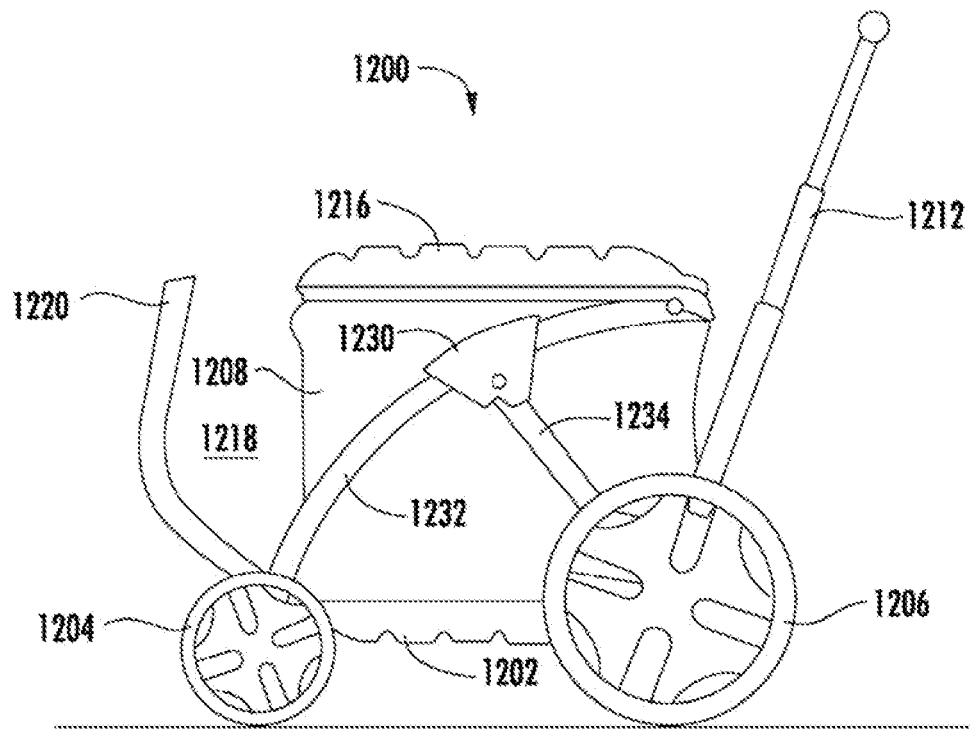
FIG. 11A is a side view of a third embodiment of a travel cooler in an expanded configuration according to the present invention.
Figure 11B:
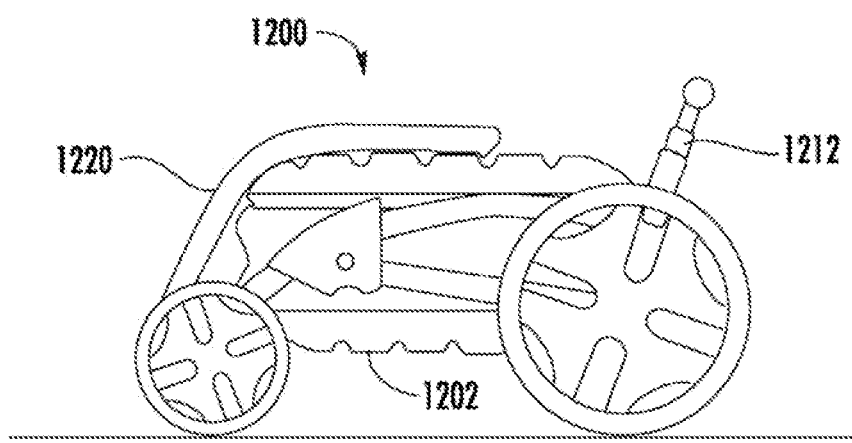
FIG. 11B is a side view of the travel cooler of FIG. 11A in a collapsed configuration.

A third embodiment of the present invention is shown in FIGS. 11A-11B. In this embodiment, the inventive travel cooler 1200 is configurable into an transport configuration as shown in FIG. 11A, and a storage configuration as shown in FIG. 11B. The cooler 1200 includes a platform 1202 having wheels 1204 and wheels 1206. A cooler container 1208 is of a soft construction capable of folding in obtaining the storage configuration in this embodiment. For example, the soft construction optionally comprises a pliable foam wall encased in durable woven nylon fabric. One or more substantially moisture impermeable layers are preferably included in the soft construction for retaining fluid such as water from melting ice within the container 1208.

A telescoping handle 1212 serves as a guide handle in directing, pushing and pulling the cooler about in its travels. A cargo receiving area 1218 is defined between the container 1208, the platform 1202, and a retaining member 1220. The retaining member 1220 pivots toward the lid 1216 for minimizing the overall outer dimensions of the cooler 1200 when the storage configuration is obtained (FIG. 11B). The cooler 1208 is configured from the transport configuration (FIG. 11A) to the storage configuration (FIG. 11B) as a framework of the cooler is collapsed. In collapsing the framework, a guide 1230 travels along an arcuate rail 1232 while a swing-arm 1234 attached to and traveling with the guide rotates about a pivot point proximal or concentric with the center of the rear wheel 1206. The framework is optionally constructed of aluminum.

Figure 12:
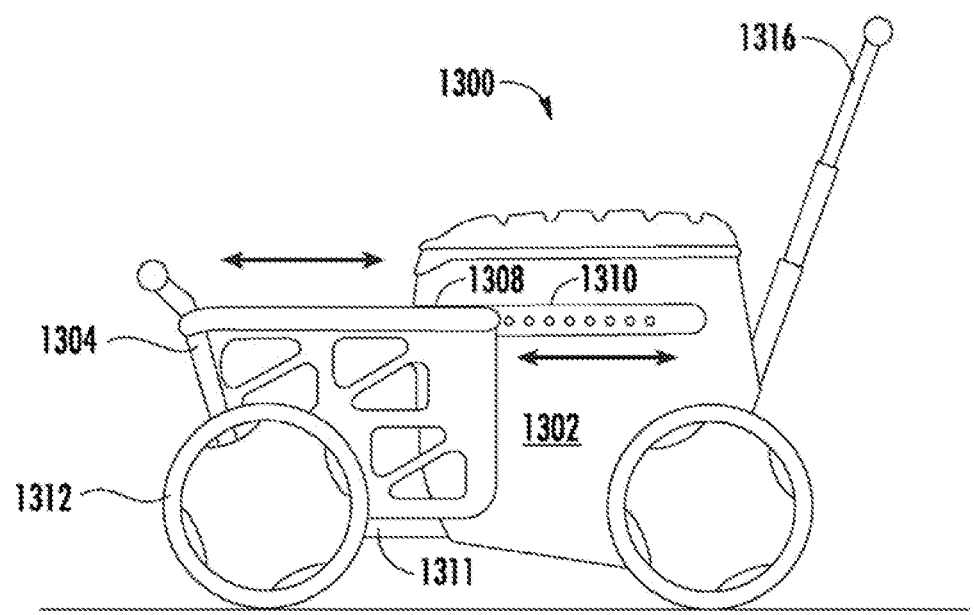
FIG. 12 is a side view of a fourth embodiment of a travel cooler according to the present invention.

A fourth embodiment of the present invention is shown in FIG. 12. In this embodiment, a cooler 1300 has a container 1302 and an extendable and retractable retaining member 1304. The retaining member 1304 has a rail 1308 that is received by a channel 1310 of the container 1302. The rail 1308 is positionable along the channel for adjustment of the position of the retaining member 1304 relative to the container 1302. The cooler is shown in FIG. 12 having obtained an extended configuration wherein the retaining member 1304 is disposed at distance from the container 1302 to define an open storage area of the storage receptacle. The cooler is configurable also into a range of retracted configurations (not shown) by disposition of the rail 1308 along the channel 1310 bringing the retaining member 1304 closer to the container thereby reducing the size of the open storage area defined by the storage receptacle. A bottom rail 1311 of the retaining member 1304 also is received within a bottom portion of the container 1302 in retracting of the retaining member 1304. The wheels 1312 of the cooler 1300 travel relative to the container 1302 with the retaining member 1304 as the rail 1308 is disposed along the channel 1310. A telescoping handle 1316 serves as a guide handle in directing, pushing and pulling the cooler about in its travels.

Figure 13:
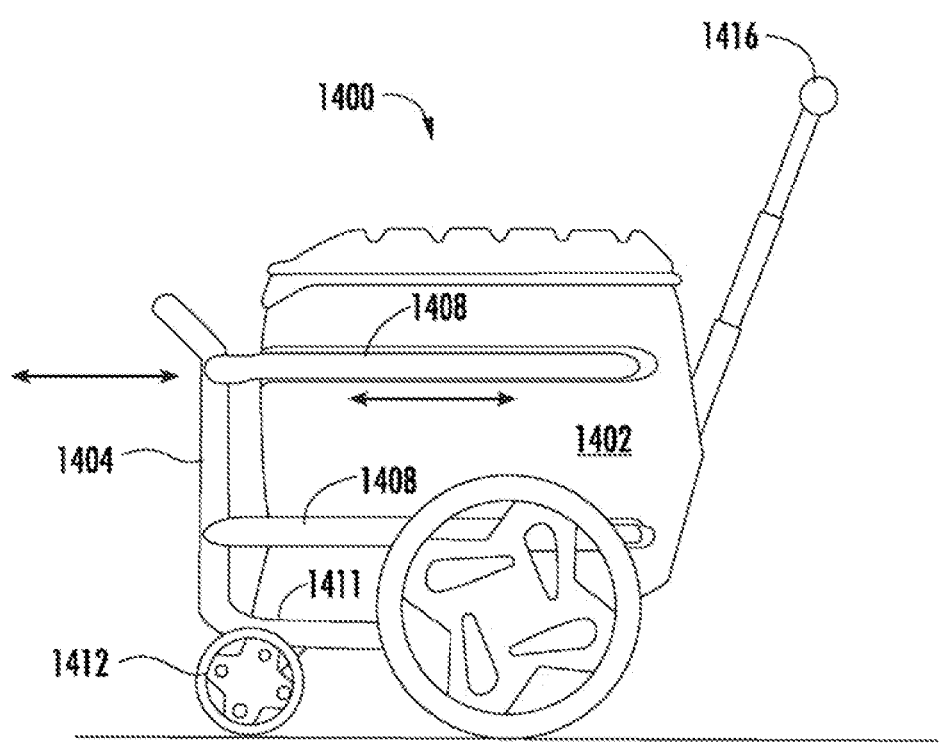
FIG. 13 is a side view of a fifth embodiment of a travel cooler according to the present invention.

A fifth embodiment of the present invention is shown in FIG. 13. In this embodiment, a cooler 1400 has a container 1402 and an extendable and retractable retaining member 1404. The retaining member 1404 has rails 1408 and a base member or rails 1411 that are received by respective channels of the container. The cooler is shown in FIG. 13 having obtained a fully retracted configuration wherein the retaining member 1404 is disposed proximal the container 1402. The cooler is configurable also into a range of extended configurations (not shown) by spacing the storage receptacle from the container. The wheels 1412 of the cooler 1400 travel relative to the container 1402 with the retaining member 1404 as the cooler is configured between the extended configuration and retracted configuration. A telescoping handle 1416 serves as a guide handle in directing, pushing and pulling the cooler about in its travels.

Figures 14A, 14B:
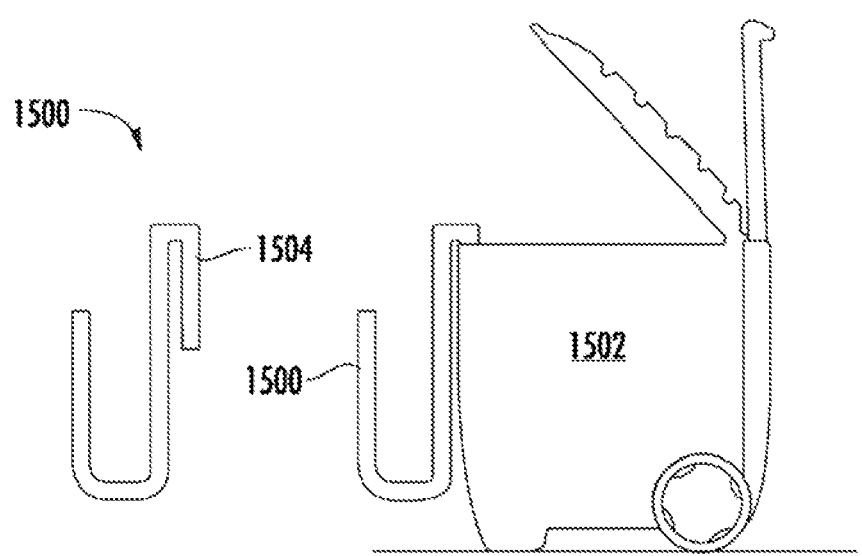
FIG. 14A is a side view of an embodiment of a storage bracket according to an aspect of the present invention.
FIG. 14B is a side view of the storage bracket of FIG. 14A removably attached to an insulated container of a travel cooler.

A sixth embodiment of the present invention is shown in FIG. 14A. In this embodiment, a retaining member in the form of a storage bracket 1500 is attachable to a wheeled cooler 1502 as shown, for example, in FIG. 14B. In this illustrated example, the retaining member 1500 has a retention clip 1504 that abuts an interior wall of the cooler such that the retaining member 1500 generally hangs from the side edge of the cooler 1502. As shown, the retaining member 1500 comprises a generally planar material bent or formed into a generally J-shape profile having the retention clip 1504 disposed at the "top" of the "J" with the bottom of the "J" providing the cargo receiving area.

What is claimed is:

1. A travel cooler, comprising:
   (a) a body comprising a base, sidewalls, and a lid connected together to define an interior, insulated containment space for holding cooler items, a lengthwise dimension of the cooler extending between opposite ends of the cooler, the body further having recessed exterior surface slots extending along a lengthwise extent of the cooler;
   (b) a pair of coaxial wheels attached to the body for rolling of the cooler when the cooler is pivoted about an axis of the wheels; and
   (c) a U-shaped handle for pivoting of the cooler about the axis of the wheels and rolling of the cooler by way of the pair of coaxial wheels, the U-shaped handle comprising two parallel legs connected by a handle portion, the handle portion extending upwardly at an angle to a plane of the parallel legs;
   (d) wherein the cooler is transitionable between,
      (1) a first configuration, in which the legs of the U-shaped handle extend from the body of the cooler a sufficient extent to allow the U-shaped handle to serve as a lever in pivoting the cooler about the axis of the pair of coaxial wheels when tilting the cooler for rolling of the cooler by way of the pair of coaxial wheels, the handle portion being distant from the body of the cooler, and
      (2) a second configuration, in which the legs of the U-shaped handle are received within the recessed exterior surface slots extending along a lengthwise extent of the body of the cooler, the handle portion extending upwardly in close proximity to an end of the body of the cooler, an axle of the pair of coaxial wheels assisting in retaining the U-shaped handle within the recessed exterior surface slots.

2. The travel cooler of claim 1, wherein the handle portion extends upwardly above the sidewalls of the body of the cooler proximate the lid of the cooler when the cooler is in the second configuration.

3. The travel cooler of claim 1, wherein the handle portion extends above a rim portion of the cooler when the cooler is in the second configuration.

4. The travel cooler of claim 1, wherein the handle is not connected to the body of the cooler by way of a hinge.

5. The travel cooler of claim 1, wherein the handle is detachable from and reattachable to the body of the cooler.

6. The travel cooler of claim 1, wherein the legs of the U-shaped handle extend a distance from the body of the cooler equal to over half of their length.

7. The travel cooler of claim 1, wherein the recessed exterior surface slots comprise two parallel, elongate channels that extend generally horizontally through the body.

8. The travel cooler of claim 1, wherein the legs of the U-shaped handle extend generally horizontally through the body when received within the recessed exterior surface slots.

9. The travel cooler of claim 1, wherein the legs of the handle are received and retained within the recessed exterior surface slots.

10. The travel cooler of claim 1, wherein the U-shaped handle is constructed from aluminum.

11. The travel cooler of claim 1, wherein the U-shaped handle is rigid.

12. The travel cooler of claim 1, wherein the sidewalls of the body of the cooler are inflatable.

13. The travel cooler of claim 12, wherein the inflatable sidewalls comprise a single, inflatable bladder, and that the bladder comprises a substantially air impermeable, flexible material that defines an inner wall and an outer wall with an enclosed space extending there between for receiving air.

14. A travel cooler, comprising:
 (a) a body comprising a base, sidewalls, and a lid connected together to define an interior, insulated containment space for holding cooler items, a lengthwise dimension of the cooler extending between opposite ends of the cooler, the body further having recessed exterior surface slots extending along a lengthwise extent of the cooler;
 (b) a pair of coaxial wheels attached to the body for rolling of the cooler when the cooler is pivoted about an axis of the wheels; and
 (c) a U-shaped handle for pivoting of the cooler about the axis of the wheels and rolling of the cooler by way of the pair of coaxial wheels, the U-shaped handle comprising,
  (1) two legs connected by a handle portion, and
  (2) a spring-biased catch;
 (d) wherein the cooler is transitionable between,
  (1) a first configuration, in which the legs of the U-shaped handle extend from the body of the cooler a sufficient extent to allow the U-shaped handle to serve as a lever in pivoting the cooler about the axis of the pair of coaxial wheels when tilting the cooler for rolling of the cooler by way of the pair of coaxial wheels, the handle portion being distant from the body of the cooler, and
  (2) a second configuration,
   (A) in which the handle portion of the U-shaped handle extends upwardly at a spacing from, but in close proximity to, an end of the body of the cooler, and
   (B) in which the legs of the U-shaped handle are received within the recessed exterior surface slots extending along a lengthwise extent of the cooler and are retained therein in a locked disposition by the spring-biased catch, an axle of the pair of coaxial wheels assisting in retaining the U-shaped handle within the recessed exterior surface slots.

15. The travel cooler of claim 14, wherein the handle further is disposed by the catch in a locked disposition when the cooler is in the first configuration.

16. A travel cooler, comprising:
 (a) a body comprising a base, sidewalls, and a lid connected together to define an interior, insulated containment space for holding cooler items, a lengthwise dimension of the cooler extending between opposite ends of the cooler, the body further having recessed exterior surface slots extending along a lengthwise extent of the cooler;
 (b) a pair of coaxial wheels attached to the body for rolling of the cooler when the cooler is pivoted about an axis of the wheels;
 (c) a U-shaped handle for pivoting of the cooler about the axis of the wheels and rolling of the cooler by way of the pair of coaxial wheels, the U-shaped handle comprising two legs connected by a handle portion; and
 (d) a second handle
 (e) wherein the cooler is transitionable between,
  (1) a first configuration, in which the legs of the U-shaped handle extend from the body of the cooler a sufficient extent to allow the U-shaped handle to serve as a lever in pivoting the cooler about the axis of the pair of coaxial wheels when tilting the cooler for rolling of the cooler by way of the pair of coaxial wheels, the handle portion being distant from the body of the cooler, and
  (2) a second configuration, in which the legs of the U-shaped handle are received within the recessed exterior surface slots extending along a lengthwise extent of the cooler, the handle portion extending in close proximity to an end of the body of the cooler, the second handle being located on an end opposite to the end of the body of the cooler proximate to which the handle portion extends when the cooler is in the second configuration, an axle of the pair of coaxial wheels assisting in retaining the U-shaped handle within the recessed exterior surface slots.

17. The travel cooler of claim 16, wherein the second handle is connected to the body of the cooler by a hinge and is pivotal to a first position, in which the handle extends at a spacing of the body, and to a second position, in which the handle extends adjacent the body of the cooler.

* * * * *